(12) United States Patent
Svendsen

(10) Patent No.: US 11,196,930 B1
(45) Date of Patent: *Dec. 7, 2021

(54) DISPLAY DEVICE CONTENT SELECTION THROUGH VIEWER IDENTIFICATION AND AFFINITY PREDICTION

(71) Applicant: Ikorongo Technology, LLC, Chapel Hill, NC (US)

(72) Inventor: Hugh Blake Svendsen, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,640

(22) Filed: Apr. 28, 2020

Related U.S. Application Data

(63) Continuation of application No. 14/870,282, filed on Sep. 30, 2015, now Pat. No. 10,638,048, which is a
(Continued)

(51) Int. Cl.
*H04N 5/232* (2006.01)
*H04N 5/225* (2006.01)
(Continued)

(52) U.S. Cl.
CPC ......... *H04N 5/23293* (2013.01); *G06F 3/041* (2013.01); *G06F 3/048* (2013.01); *G06F 16/50* (2019.01); *G06K 9/00228* (2013.01); *G06K 9/00281* (2013.01); *G06K 9/00288* (2013.01); *G06K 9/00677* (2013.01);
(Continued)

(58) Field of Classification Search
CPC .. H04N 5/23293; H04N 9/8715; H04N 5/232; H04N 7/183; H04N 5/2253; H04N 5/23203; H04N 5/23219; G06K 9/00677; G06K 9/00221; G06K 2009/00328; G06K 9/6201; G06K 9/00281; G06K 9/00228;
(Continued)

(56) References Cited

U.S. PATENT DOCUMENTS 6,526,158 B1 2/2003 Goldberg
6,591,068 B1 7/2003 Dietz
(Continued)

OTHER PUBLICATIONS

U.S. Appl. No. 12/703,846, filed Feb. 11, 2010, U.S. Pat. No. 9,210,313, Dec. 8, 2015, Patented Case, Improving Display Device Content Selection Through Viewer Identification and Affinity Prediction.
(Continued)

*Primary Examiner* — Twyler L Haskins
*Assistant Examiner* — Akshay Trehan

(57) ABSTRACT

Method and device are described for customizing the content selection to present on a display device based on identifying the viewer of the device. In one embodiment, the present disclosure relates to selecting from among a group of digital images, those images that are most likely to be of interest to the viewer. In general, many of the images available to the display device will be comprised of images containing subject faces. Using the relationship information to predict subject affinity, the display device computes an image affinity for each image by accumulating the individual subject affinity predictions between the viewer and each subject identified in each image. The image affinities are used to select images for presentation on the display device.

53 Claims, 37 Drawing Sheets

Related U.S. Application Data continuation of application No. 12/703,846, filed on Feb. 11, 2010, now Pat. No. 9,210,313.

(60) Provisional application No. 61/207,787, filed on Feb. 17, 2009.

(51) Int. Cl.

| | | |
|---|---|---|
| *H04N 7/18* | (2006.01) | |
| *H04N 9/87* | (2006.01) | |
| *G06K 9/00* | (2006.01) | |
| *G06K 9/62* | (2006.01) | |
| *G06F 3/041* | (2006.01) | |
| *G06F 3/048* | (2013.01) | |
| *G06F 16/50* | (2019.01) | |
| *H04L 29/06* | (2006.01) | |
| *G11B 27/19* | (2006.01) | |

(52) U.S. Cl.
CPC ............ *G06K 9/6201* (2013.01); *G11B 27/19* (2013.01); *H04L 67/42* (2013.01); *H04N 5/2253* (2013.01); *H04N 5/232* (2013.01); *H04N 5/23203* (2013.01); *H04N 5/23219* (2013.01); *H04N 7/183* (2013.01); *H04N 9/8715* (2013.01); *G06K 9/00221* (2013.01); *G06K 2009/00328* (2013.01)

(58) Field of Classification Search
CPC ..... G06K 9/00288; G06F 16/50; G06F 3/041; G06F 3/048; G11B 27/19; H04L 67/42
See application file for complete search history.

(56) References Cited

U.S. PATENT DOCUMENTS

| | | |
|---|---|---|
| 6,606,398 B2 | 8/2003 | Cooper |
| 6,745,186 B1 | 6/2004 | Testa |
| 6,819,783 B2 | 11/2004 | Goldberg |
| 7,068,309 B2 | 6/2006 | Toyama et al. |
| 7,107,605 B2 | 9/2006 | Janik |
| 7,154,642 B2 | 12/2006 | Lichtfuss |
| 7,203,367 B2 | 4/2007 | Shniberg et al. |
| 7,236,960 B2 | 6/2007 | Manico et al. |
| 7,260,587 B2 | 8/2007 | Testa |
| 7,266,563 B2 | 9/2007 | Morris et al. |
| 7,391,886 B1 | 1/2008 | Clark |
| 7,376,276 B2 | 5/2008 | Shniberg et al. |
| 7,376,696 B2 | 5/2008 | Bell |
| 7,426,532 B2 | 9/2008 | Bell |
| 7,472,134 B2 | 12/2008 | Kaku |
| 7,526,106 B1 | 4/2009 | Clark |
| 7,561,723 B2 | 7/2009 | Goldberg |
| 7,562,056 B2 | 7/2009 | Ma et al. |
| 7,619,660 B2 | 11/2009 | Grosvenor |
| 7,684,651 B2 | 3/2010 | Tang |
| 7,716,140 B1 * | 5/2010 | Nielsen .................. G06Q 10/10 705/319 |
| 7,716,157 B1 | 5/2010 | Bourdev et al. |
| 7,730,130 B2 | 6/2010 | Issa |
| 7,739,304 B2 | 6/2010 | Naaman et al. |
| 7,760,917 B2 * | 7/2010 | Vanhoucke ........ G06K 9/00677 382/115 |
| 7,783,085 B2 | 8/2010 | Perlmutter et al. |
| 7,860,347 B2 | 12/2010 | Tang et al. |
| 7,907,755 B1 | 3/2011 | Perlmutter et al. |
| 7,916,894 B1 | 3/2011 | Dhillon et al. |
| 7,933,972 B1 | 4/2011 | Issa et al. |
| 7,953,690 B2 | 5/2011 | Luo |
| 7,961,986 B1 | 6/2011 | Jing et al. |
| 7,965,908 B2 | 6/2011 | Hayashi |
| 7,995,806 B2 | 8/2011 | Goh et al. |
| 8,014,572 B2 | 9/2011 | Xiao et al. |
| 8,144,944 B2 | 3/2012 | Ishii |
| 8,189,880 B2 | 5/2012 | Wen et al. |
| 8,204,437 B1 | 6/2012 | Rothschild |
| 8,233,679 B2 | 7/2012 | Perlmutter et al. |
| 8,284,990 B2 | 10/2012 | Ma et al. |
| 8,306,284 B2 | 11/2012 | Goldberg et al. |
| 8,315,463 B2 | 11/2012 | Gallagher et al. |
| 8,325,999 B2 | 12/2012 | Kapoor et al. |
| 8,341,145 B2 | 12/2012 | Dodson et al. |
| 8,358,811 B2 | 1/2013 | Adams et al. |
| 8,396,265 B1 | 3/2013 | Ross et al. |
| 8,402,094 B2 | 3/2013 | Bosworth et al. |
| 8,437,797 B2 | 5/2013 | Rothschild |
| 8,543,454 B2 | 9/2013 | Fleischman et al. |
| 8,594,722 B2 | 11/2013 | Rothschild |
| 8,630,494 B1 | 1/2014 | Svendsen |
| 8,731,819 B2 | 5/2014 | Dzubay et al. |
| 9,195,679 B1 | 11/2015 | Svendsen |
| 9,210,313 B1 | 12/2015 | Svendsen |
| 9,269,081 B1 | 2/2016 | Panzer |
| 9,727,312 B1 | 8/2017 | Svendsen |
| 9,979,800 B2 | 5/2018 | Berookhim et al. |
| 10,262,126 B2 | 4/2019 | Tussy |
| 10,334,158 B2 | 6/2019 | Gove |
| 2002/0080255 A1 | 6/2002 | Lichtfuss |
| 2002/0126150 A1 | 9/2002 | Parry |
| 2003/0063770 A1 | 4/2003 | Svendsen et al. |
| 2003/0063771 A1 | 4/2003 | Morris et al. |
| 2003/0095152 A1 | 5/2003 | Fong |
| 2003/0161499 A1 | 8/2003 | Svendsen |
| 2004/0044723 A1 | 3/2004 | Bell |
| 2004/0044724 A1 | 3/2004 | Bell |
| 2004/0044725 A1 | 3/2004 | Bell |
| 2004/0174440 A1 | 9/2004 | Kojima et al. |
| 2005/0162711 A1 | 7/2005 | Wu |
| 2005/0171955 A1 | 8/2005 | Hull |
| 2005/0280502 A1 * | 12/2005 | Bell .................. G07C 9/37 340/5.83 |
| 2006/0048059 A1 | 3/2006 | Etkin |
| 2006/0161867 A1 | 3/2006 | Drucker |
| 2006/0078201 A1 * | 4/2006 | Kim .................. G06K 9/00677 382/181 |
| 2006/0098875 A1 | 5/2006 | Sugimoto |
| 2006/0140455 A1 | 6/2006 | Costache et al. |
| 2006/0170669 A1 | 8/2006 | Walker et al. |
| 2006/0238502 A1 | 10/2006 | Kanamori et al. |
| 2006/0242238 A1 | 10/2006 | Issa |
| 2006/0251338 A1 | 11/2006 | Gokturk et al. |
| 2007/0040033 A1 | 2/2007 | Rosenberg |
| 2007/0118508 A1 | 5/2007 | Svendsen |
| 2007/0118509 A1 | 5/2007 | Svendsen |
| 2007/0118525 A1 | 5/2007 | Svendsen |
| 2007/0150916 A1 | 6/2007 | Begole et al. |
| 2007/0239778 A1 * | 10/2007 | Gallagher .......... G06K 9/00221 |
| 2007/0291153 A1 | 12/2007 | Araki et al. |
| 2008/0040475 A1 * | 2/2008 | Bosworth ............. H04L 67/327 709/224 |
| 2008/0059903 A1 | 3/2008 | Kaminaga et al. |
| 2008/0062283 A1 | 3/2008 | Matsushita et al. |
| 2008/0066360 A1 | 3/2008 | Simon |
| 2008/0080745 A1 * | 4/2008 | Vanhoucke ........ G06K 9/00295 382/118 |
| 2008/0086511 A1 | 4/2008 | Takao et al. |
| 2008/0189766 A1 | 8/2008 | Bell et al. |
| 2008/0195962 A1 | 8/2008 | Lin et al. |
| 2008/0279419 A1 | 11/2008 | Kluesing et al. |
| 2008/0298766 A1 | 12/2008 | Wen et al. |
| 2008/0310688 A1 | 12/2008 | Goldberg |
| 2008/0317386 A1 | 12/2008 | Wood et al. |
| 2009/0016576 A1 * | 1/2009 | Goh .................. G06K 9/00677 382/118 |
| 2009/0046954 A1 * | 2/2009 | Ishii .................. G06K 9/00221 382/312 |
| 2009/0063995 A1 | 3/2009 | Baron et al. |
| 2009/0080714 A1 | 3/2009 | Koda |
| 2009/0112462 A1 | 4/2009 | Lo |
| 2009/0199226 A1 | 8/2009 | Suehiro et al. |
| 2009/0216806 A1 | 8/2009 | Feuerstein et al. |
| 2009/0234815 A1 | 9/2009 | Boerries et al. |
| 2009/0245657 A1 | 10/2009 | Osugi |

(56) References Cited

U.S. PATENT DOCUMENTS

| | | |
|---|---|---|
| 2009/0252383 A1 | 10/2009 | Adam et al. |
| 2009/0292549 A1* | 11/2009 | Ma ................... G06K 9/00677 705/319 |
| 2010/0036875 A1 | 2/2010 | Miezianko |
| 2010/0054601 A1* | 3/2010 | Anbalagan ......... G06K 9/00677 382/180 |
| 2010/0067027 A1 | 3/2010 | Kunieda |
| 2010/0080464 A1 | 4/2010 | Sawai et al. |
| 2010/0125786 A1 | 5/2010 | Ozawa et al. |
| 2010/0142833 A1 | 6/2010 | Ishizawa |
| 2010/0150407 A1 | 6/2010 | Cheswick |
| 2010/0172550 A1 | 7/2010 | Gilley et al. |
| 2010/0172551 A1 | 7/2010 | Gilley et al. |
| 2010/0177938 A1 | 7/2010 | Martinez et al. |
| 2010/0191728 A1 | 7/2010 | Reilly |
| 2010/0245535 A1 | 9/2010 | Mauchly |
| 2010/0287592 A1 | 11/2010 | Patten et al. |
| 2010/0310135 A1 | 12/2010 | Nagaoka et al. |
| 2010/0315497 A1* | 12/2010 | Jiang ................... G06K 9/00221 348/77 |
| 2011/0022529 A1 | 1/2011 | Barsoba |
| 2011/0038512 A1 | 2/2011 | Petrou et al. |
| 2011/0098917 A1 | 4/2011 | LeBeau et al. |
| 2011/0107369 A1 | 5/2011 | OBrien et al. |
| 2011/0145719 A1 | 6/2011 | Chen et al. |
| 2011/0150340 A1 | 6/2011 | Gotoh et al. |
| 2011/0182482 A1 | 7/2011 | Winters et al. |
| 2011/0182485 A1* | 7/2011 | Shochat ................ H04L 65/403 382/118 |
| 2011/0188742 A1 | 8/2011 | Yu et al. |
| 2011/0211736 A1 | 9/2011 | Krupka et al. |
| 2011/0211737 A1 | 9/2011 | Krupka et al. |
| 2011/0234613 A1 | 9/2011 | Hanson et al. |
| 2011/0243397 A1 | 10/2011 | Watkins et al. |
| 2011/0268323 A1 | 11/2011 | Gallagher |
| 2012/0076367 A1 | 3/2012 | Tseng |
| 2012/0250950 A1 | 10/2012 | Papakipos et al. |
| 2012/0250951 A1 | 10/2012 | Chen |
| 2012/0265758 A1 | 10/2012 | Han et al. |
| 2012/0275666 A1 | 11/2012 | Gao |
| 2012/0278387 A1 | 11/2012 | Garcia et al. |
| 2012/0278395 A1 | 11/2012 | Garcia |
| 2012/0310968 A1 | 12/2012 | Tseng |
| 2013/0035114 A1 | 2/2013 | Holden et al. |
| 2013/0290439 A1 | 10/2013 | Blom |
| 2016/0019413 A1 | 1/2016 | Svendsen |
| 2017/0195842 A1 | 7/2017 | Brady, Jr. et al. |

OTHER PUBLICATIONS

U.S. Appl. No. 12/703,871, filed Feb. 11, 2010, Abandoned, Matching Subjects in a Collection of Images to Users of a Central System.

U.S. Appl. No. 12/762,698, filed Apr. 19, 2010, U.S. Pat. No. 9,727,312, Patented Case, Providing Subject Information Regarding Upcoming Images on a Display.

U.S. Appl. No. 14/870,699, filed Sep. 30, 2015, U.S. Pat. No. 9,400,931, Patented Case, Providing Subject Information Regarding Upcoming Images on a Display.

U.S. Appl. No. 14/870,282, filed Sep. 30, 2015, U.S. Pat. No. 10,638,048, Apr. 28, 2020, Pending, Improving Display Device Content Selection Through Viewer Identification and Affinity Prediction.

U.S. Appl. No. 14/870,303, filed Sep. 30, 2015, U.S. Pat. No. 9,483,697, Nov. 1, 2016, Patented Case, Improving Display Device Content Selection Through Viewer Identification And Affinity Prediction.

U.S. Appl. No. 15/218,222, filed Jul. 25, 2016, U.S. Pat. No. 15,218,222, Sep. 25, 2018, Providing Subject Information Regarding Upcoming Images on a Display.

U.S. Appl. No. 16/125,912, filed Sep. 10, 2018, Allowed, Interface for Receiving Subject Affinity Information.

* cited by examiner

VIEWER TO IMAGE AFFINITY MATRIX
( IMAGE AFFINITY )

*FROM*

| TO | VIEWER 1 | VIEWER 2 | VIEWER 3 | VIEWER 4 | VIEWER 5 | VIEWER 6 | VIEWER 7 | VIEWER 8 |
|---|---|---|---|---|---|---|---|---|
| IMAGE 1 | | | | | | | | |
| IMAGE 2 | | | | | | | | |
| IMAGE 3 | | | | | | | | |
| IMAGE 4 | | | | | | | | |
| IMAGE 5 | | 322 | | | | | | |
| IMAGE 6 | | | | | | | | |
| IMAGE 7 | | | | | | | | |
| IMAGE 8 | | | | | | | | |

FIG. 5B

S = FACE OCCURRENCE MATRIX

|  | IMAGE 1 | IMAGE 2 | IMAGE 3 | IMAGE 4 | IMAGE 5 | IMAGE 6 | IMAGE 7 | IMAGE 8 |
|---|---|---|---|---|---|---|---|---|
| SUBJECT 1 | 1 | 0 | 0 | 0 | 0 | 0 | 1 | 0 |
| SUBJECT 2 | 1 | 1 | 0 | 0 | 1 | 0 | 0 | 0 |
| SUBJECT 3 | 1 | 1 | 0 | 0 | 0 | 0 | 1 | 0 |
| SUBJECT 4 | 0 | 0 | 1 | 0 | 1 | 0 | 0 | 0 |
| SUBJECT 5 | 0 | 0 | 1 | 0 | 0 | 1 | 1 | 1 |
| SUBJECT 6 | 0 | 1 | 0 | 0 | 1 | 1 | 0 | 1 |
| SUBJECT 7 | 0 | 0 | 0 | 0 | 1 | 0 | 0 | 0 |
| SUBJECT 8 | 0 | 0 | 0 | 0 | 0 | 1 | 0 | 0 |

FIG 14B

| | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 0 | 1 | 0 | 1 | 1 | 0 | 0 | 1 |
| SUBJECT 2 | 1 | 0 | 1 | 0 | 1 | 0 | 0 | 0 |
| SUBJECT 3 | 0 | 1 | 0 | 0 | 0 | 0 | 1 | 0 |
| SUBJECT 4 | 1 | 0 | 0 | 0 | 0 | 1 | 0 | 0 |
| SUBJECT 5 | 1 | 1 | 0 | 0 | 0 | 1 | 0 | 0 |
| SUBJECT 6 | 0 | 0 | 0 | 1 | 1 | 0 | 0 | 1 |
| SUBJECT 7 | 0 | 0 | 1 | 0 | 0 | 0 | 0 | 0 |
| SUBJECT 8 | 1 | 0 | 0 | 0 | 0 | 1 | 0 | 0 |

FIG 15B: SOCIAL CONNECTIONS

FIG 15C: SOCIAL DISTANCE MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 0 | 1 | 2 | 1 | 2 | 2 | 3 | 1 |
| SUBJECT 2 | 1 | 0 | 1 | 2 | 1 | 2 | 2 | 4 |
| SUBJECT 3 | 2 | 1 | 0 | 3 | 2 | 4 | 1 | 3 |
| SUBJECT 4 | 1 | 2 | 3 | 0 | 2 | 3 | 4 | 2 |
| SUBJECT 5 | 1 | 1 | 2 | 2 | 0 | 1 | 3 | 2 |
| SUBJECT 6 | 2 | 2 | 4 | 3 | 1 | 0 | 4 | 1 |
| SUBJECT 7 | 3 | 2 | 1 | 4 | 3 | 4 | 0 | 4 |
| SUBJECT 8 | 1 | 4 | 3 | 2 | 2 | 1 | 4 | 0 |

FIG 15D: W = SOCIAL DISTANCE WEIGHTING SUBJECT TO SUBJECT AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 1.00 | 0.25 | 0.11 | 0.25 | 0.25 | 0.11 | 0.06 | 0.25 |
| SUBJECT 2 | 0.25 | 1.00 | 0.25 | 0.11 | 0.25 | 0.11 | 0.11 | 0.04 |
| SUBJECT 3 | 0.11 | 0.25 | 1.00 | 0.06 | 0.11 | 0.04 | 0.25 | 0.06 |
| SUBJECT 4 | 0.25 | 0.11 | 0.06 | 1.00 | 0.11 | 0.06 | 0.04 | 0.11 |
| SUBJECT 5 | 0.25 | 0.25 | 0.11 | 0.11 | 1.00 | 0.25 | 0.06 | 0.11 |
| SUBJECT 6 | 0.11 | 0.11 | 0.04 | 0.06 | 0.25 | 1.00 | 0.04 | 0.25 |
| SUBJECT 7 | 0.06 | 0.11 | 0.25 | 0.04 | 0.06 | 0.04 | 1.00 | 0.04 |
| SUBJECT 8 | 0.25 | 0.04 | 0.06 | 0.11 | 0.11 | 0.25 | 0.04 | 1.00 |

FIG 15E: P = VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 1.36 | 1.50 | 1.36 | 0.42 | 0.61 | 0.26 | 0.42 | 0.35 |
| IMAGE 2 | 0.47 | 1.36 | 1.29 | 0.24 | 0.61 | 1.15 | 0.40 | 0.35 |
| IMAGE 3 | 0.50 | 0.36 | 0.17 | 1.11 | 1.11 | 0.31 | 0.10 | 0.22 |
| IMAGE 4 | 0.00 | 0.00 | 0.00 | 0.00 | 0.00 | 0.00 | 0.00 | 0.00 |
| IMAGE 5 | 0.67 | 1.33 | 0.60 | 1.21 | 0.67 | 1.21 | 1.19 | 0.44 |
| IMAGE 6 | 0.61 | 0.47 | 0.21 | 0.28 | 1.36 | 1.50 | 0.14 | 1.36 |
| IMAGE 7 | 1.36 | 0.75 | 1.22 | 0.42 | 1.36 | 0.40 | 0.38 | 0.42 |
| IMAGE 8 | 0.36 | 0.36 | 0.15 | 0.17 | 1.25 | 1.25 | 0.10 | 0.36 |

FIG 15F: P NORMALIZED VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 0.91 | 1.00 | 0.91 | 0.28 | 0.41 | 0.17 | 0.28 | 0.24 |
| IMAGE 2 | 0.31 | 0.91 | 0.86 | 0.16 | 0.41 | 0.77 | 0.27 | 0.24 |
| IMAGE 3 | 0.33 | 0.24 | 0.12 | 0.74 | 0.74 | 0.21 | 0.07 | 0.15 |
| IMAGE 4 | 0.00 | 0.00 | 0.00 | 0.00 | 0.00 | 0.00 | 0.00 | 0.00 |
| IMAGE 5 | 0.45 | 0.89 | 0.40 | 0.81 | 0.45 | 0.81 | 0.79 | 0.29 |
| IMAGE 6 | 0.41 | 0.31 | 0.14 | 0.19 | 0.91 | 1.00 | 0.10 | 0.91 |
| IMAGE 7 | 0.91 | 0.50 | 0.81 | 0.28 | 0.91 | 0.27 | 0.25 | 0.28 |
| IMAGE 8 | 0.24 | 0.24 | 0.10 | 0.12 | 0.83 | 0.83 | 0.07 | 0.24 |

FIG 16A: FACE CO-OCCURRENCE MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 4 | 2 | 2 | 0 | 1 | 1 | 0 | 1 |
| SUBJECT 2 | 2 | 4 | 2 | 0 | 1 | 1 | 1 | 0 |
| SUBJECT 3 | 2 | 2 | 4 | 0 | 0 | 1 | 0 | 1 |
| SUBJECT 4 | 0 | 0 | 0 | 4 | 0 | 1 | 1 | 0 |
| SUBJECT 5 | 1 | 1 | 0 | 0 | 4 | 1 | 0 | 1 |
| SUBJECT 6 | 1 | 1 | 1 | 1 | 1 | 4 | 1 | 1 |
| SUBJECT 7 | 0 | 1 | 0 | 1 | 0 | 1 | 4 | 1 |
| SUBJECT 8 | 1 | 0 | 1 | 0 | 1 | 1 | 1 | 4 |

FIG 16B: W = FACE CO-OCCURRENCE SUBJECT TO SUBJECT AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 1.00 | 0.50 | 0.50 | 0.00 | 0.25 | 0.25 | 0.00 | 0.25 |
| SUBJECT 2 | 0.50 | 1.00 | 0.50 | 0.00 | 0.25 | 0.25 | 0.25 | 0.00 |
| SUBJECT 3 | 0.50 | 0.50 | 1.00 | 0.00 | 0.00 | 0.25 | 0.00 | 0.25 |
| SUBJECT 4 | 0.00 | 0.00 | 0.00 | 1.00 | 0.00 | 0.25 | 0.25 | 0.00 |
| SUBJECT 5 | 0.25 | 0.25 | 0.00 | 0.00 | 1.00 | 0.25 | 0.00 | 0.25 |
| SUBJECT 6 | 0.25 | 0.25 | 0.25 | 0.25 | 0.25 | 1.00 | 0.25 | 0.25 |
| SUBJECT 7 | 0.00 | 0.25 | 0.00 | 0.25 | 0.00 | 0.25 | 1.00 | 0.25 |
| SUBJECT 8 | 0.25 | 0.00 | 0.25 | 0.00 | 0.25 | 0.25 | 0.25 | 1.00 |

FIG 16C: P = SW VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 2.00 | 2.00 | 2.00 | 0.00 | 0.50 | 0.75 | 0.25 | 0.50 |
| IMAGE 2 | 1.25 | 1.75 | 1.75 | 0.25 | 0.50 | 1.50 | 0.50 | 0.50 |
| IMAGE 3 | 0.25 | 0.25 | 0.00 | 1.00 | 1.00 | 0.50 | 0.25 | 0.25 |
| IMAGE 4 | 0.00 | 0.00 | 0.00 | 0.00 | 0.00 | 0.00 | 0.00 | 0.00 |
| IMAGE 5 | 0.75 | 1.50 | 0.75 | 1.50 | 0.50 | 1.75 | 1.75 | 0.50 |
| IMAGE 6 | 0.75 | 0.50 | 0.50 | 0.25 | 1.50 | 1.50 | 0.50 | 1.50 |
| IMAGE 7 | 1.75 | 1.25 | 1.50 | 0.00 | 1.25 | 0.75 | 0.00 | 0.75 |
| IMAGE 8 | 0.50 | 0.50 | 0.25 | 0.25 | 1.25 | 1.25 | 0.25 | 0.50 |

FIG 16D: P NORMALIZED VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 1.00 | 1.00 | 1.00 | 0.00 | 0.25 | 0.38 | 0.13 | 0.25 |
| IMAGE 2 | 0.63 | 0.88 | 0.88 | 0.13 | 0.25 | 0.75 | 0.25 | 0.25 |
| IMAGE 3 | 0.13 | 0.13 | 0.00 | 0.50 | 0.50 | 0.25 | 0.13 | 0.13 |
| IMAGE 4 | 0.00 | 0.00 | 0.00 | 0.00 | 0.00 | 0.00 | 0.00 | 0.00 |
| IMAGE 5 | 0.38 | 0.75 | 0.38 | 0.75 | 0.25 | 0.88 | 0.88 | 0.25 |
| IMAGE 6 | 0.38 | 0.25 | 0.25 | 0.13 | 0.75 | 0.75 | 0.25 | 0.75 |
| IMAGE 7 | 0.88 | 0.63 | 0.75 | 0.00 | 0.63 | 0.38 | 0.00 | 0.38 |
| IMAGE 8 | 0.25 | 0.25 | 0.13 | 0.13 | 0.63 | 0.63 | 0.13 | 0.25 |

| ZONE | MULTIPLIER |
|---|---|
| A | 1 |
| B | 0.5 |

USING FACE SIZE TO IMAGE SIZE
RATIOS TO REFINE IMAGE AFFINITY

| MAX FACES | FACE AREA TO TOTAL IMAGE AREA RATIO | MULTIPLIER |
|---|---|---|
| 2 | 0.5 | 1 |
| 4 | 0.25 | 0.5 |
| 8 | 0.125 | 0.25 |
| 16 | 0.0625 | 0.125 |
| 32 | 0.03125 | 0.0625 |

| RATIO OF DISTANCE BETWEEN FACE / DIAGONAL DISTANCE OF IMAGE | WEIGHT |
|---|---|
| > 0.3 | 0.5 |
| < 0.3 | 1 |

DISPLAY DEVICE CONTENT SELECTION THROUGH VIEWER IDENTIFICATION AND AFFINITY PREDICTION

CROSS REFERENCE TO RELATED APPLICATIONS

This application claims priority from U.S. patent application Ser. No. 14/870,282, entitled "IMPROVING DISPLAY DEVICE CONTENT SELECTION THROUGH VIEWER IDENTIFICATION AND AFFINITY PREDICTION" which was filed Sep. 15, 2015 and claims priority from U.S. patent application Ser. No. 12/703,846, entitled "IMPROVING DISPLAY DEVICE CONTENT SELECTION THROUGH VIEWER IDENTIFICATION AND AFFINITY PREDICTION" which was filed Feb. 11, 2010 and claims priority from U.S. Provisional Application Ser. No. 61/207,787 filed on Feb. 17, 2009. U.S. patent application Ser. No. 12/703,846 and U.S. Provisional Application No. 61/207,787 are all commonly owned, and are all incorporated herein by reference in their entirety.

FIELD OF THE DISCLOSURE

The present disclosure relates to using viewer identity information to form a customized selection of images for display.

BACKGROUND OF THE DISCLOSURE

With the proliferation of digital imaging content and the popularity of image display devices, there is a desire for new ways in which to identify the images picked for display.

SUMMARY OF THE DISCLOSURE

The present disclosure relates to customizing a content selection to present on a display device based on identifying the viewer of a device. In one embodiment, the present disclosure relates to selecting from among a group of digital images, those images that are most likely to be of interest to the viewer. In general, many of the images available to the display device will be comprised of images containing subject faces. The subject faces present in each of the images are resolved, and used to produce a face index containing a unique entry for each subject face contained in the collection, plus the face of the viewer. In one embodiment, this face index is electronically transmitted to a central system and each face in the index is matched with the corresponding user account of the central system. Using the relationship information present in the account records, the social distance between each identified face in the index is obtained. Using this information to predict affinity, the system operates to compute a composite score for each image in the collection by accumulating the individual affinity predictions between the viewer and each subject identified in each image. Composite scores are then used to sort the images, with the higher scoring images being selected for presentation on the display device.

In another embodiment of the present disclosure, a method and device are disclosed comprising the steps of: obtaining a subject affinity for each of a plurality of subjects that appear in a collection of images, the subject affinity defining an affinity between a reference person and a corresponding one of the plurality of subjects; determining an image affinity for each of a plurality of images in the collection of images based on the subject affinity for each of the plurality of subjects, the image affinity defining an affinity between the reference person and corresponding one of the plurality of images; and selecting at least one image from the collection of images based on the image affinity for each of the plurality of images.

In another embodiment of the present disclosure, a method is disclosed comprising the steps of: obtaining a subject identifier for each of a plurality of subjects that appear in a collection of images, the subject identifier comprising subject information describing the corresponding one of the plurality of subjects; computing a match score representing the likelihood of a potential match between one or more of the plurality of subjects and a corresponding one or more of a plurality central system users; obtaining a match threshold indicating a numerical threshold above which a match is declared; and comparing the match score to the match threshold to determine if any matches have been achieved.

In another embodiment of the present disclosure, a method is disclosed for maintaining a structure representing an image collection in computer memory, the method comprising the steps of: maintaining a subject index, the subject index representing a plurality of subjects that appear in a collection of images, the subject index comprising: a reference for each subject to a corresponding image of the face of the subject; a reference for each subject to each image in the collection of images in which the subjects face is found; subject affinity information, the subject affinity defining the attraction between each of the subjects in the collection of images; and image affinity information, the image affinity information defining the preference of each subject in the collection of images, to each image in the collection of images. The method further comprising maintaining an image index, the image index representing the collection of images, and containing references from each image to the plurality of subjects appearing in the image.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
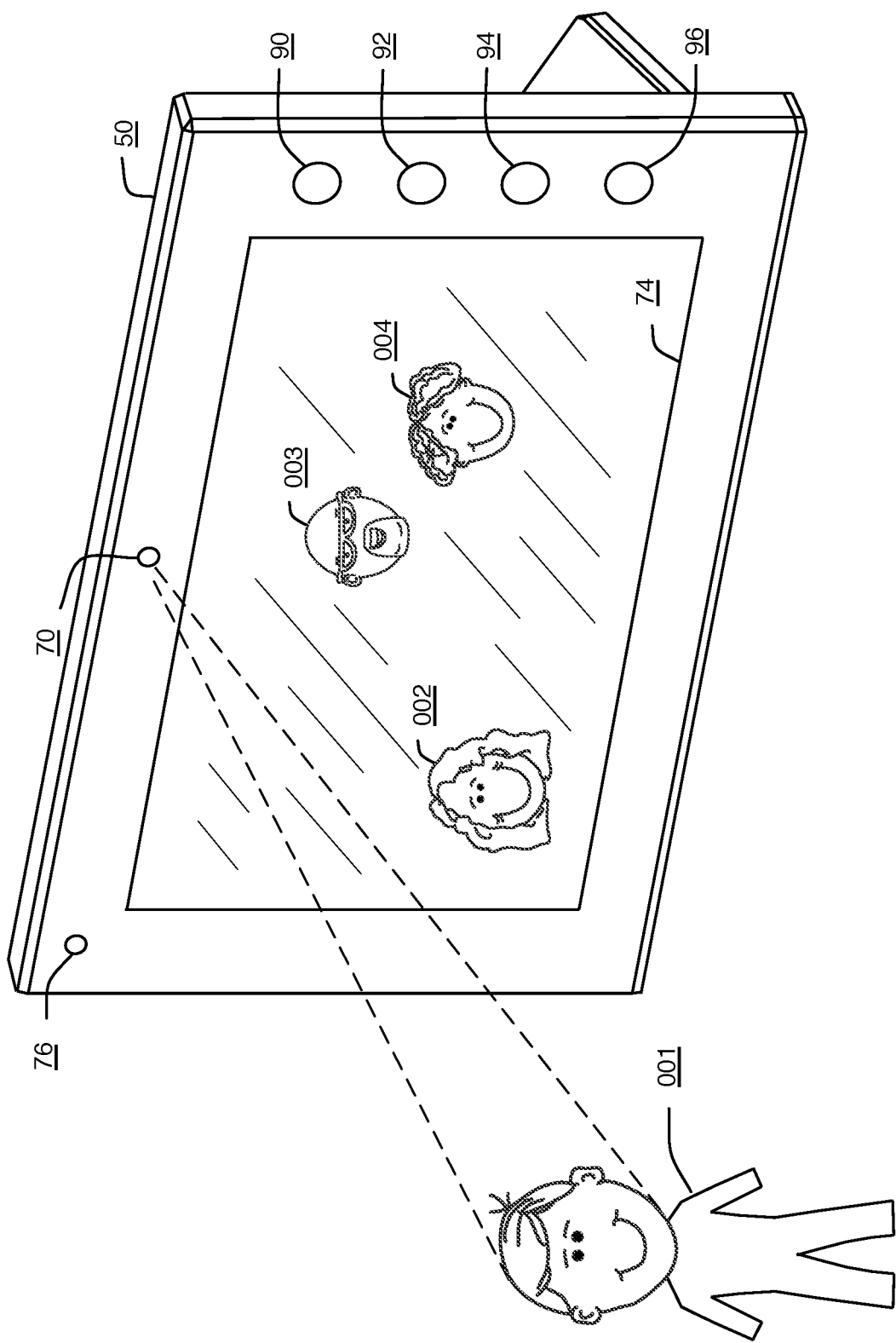
FIG. 1 illustrates a display device capable of identifying a viewer, and customizing the content shown on the display device to that viewer.
Figure 2:
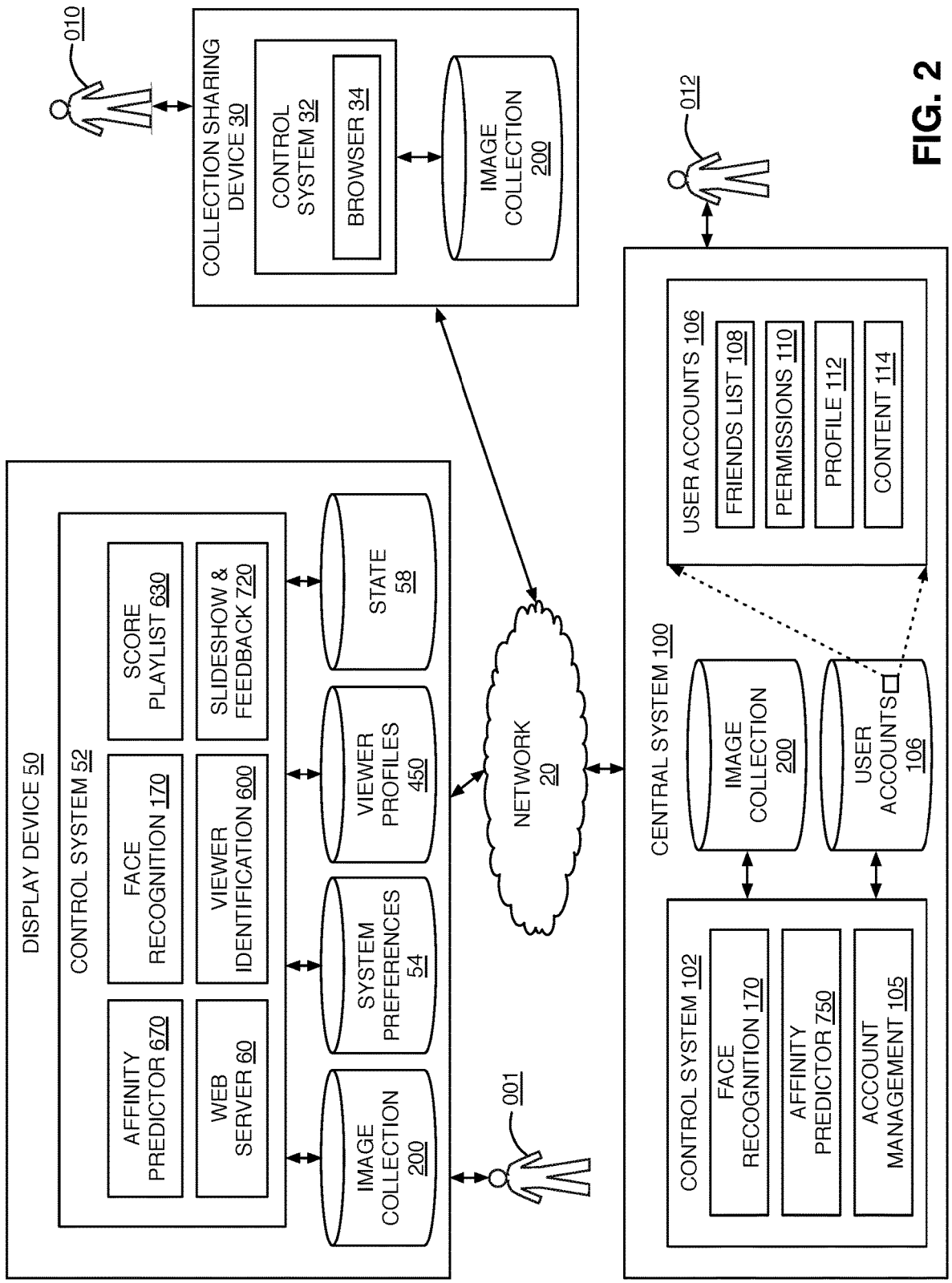
FIG. 2 illustrates a collection sharing device for providing additional content to a display device over a network, and a central system for providing affinity information between subjects found in the image content.
Figure 4B:
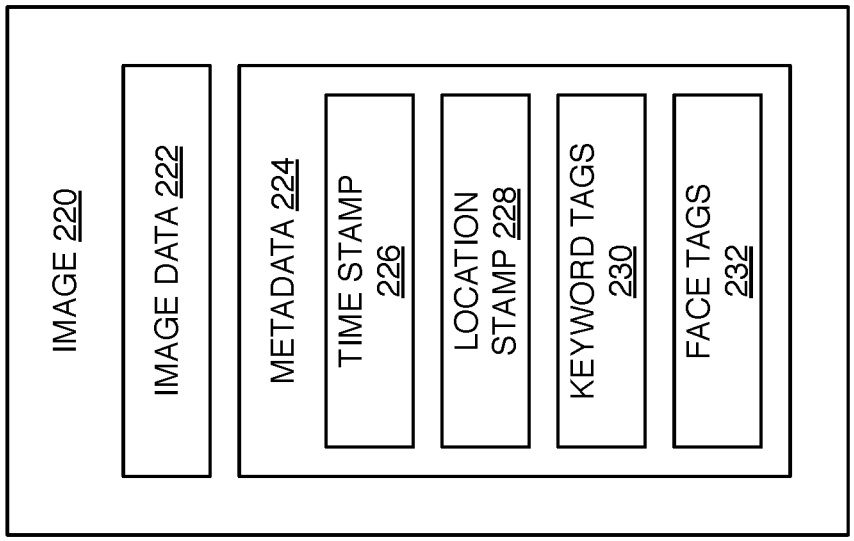
FIG. 4B is a block diagram of an exemplary embodiment of the data structure used to represent an image.
Figure 4A:
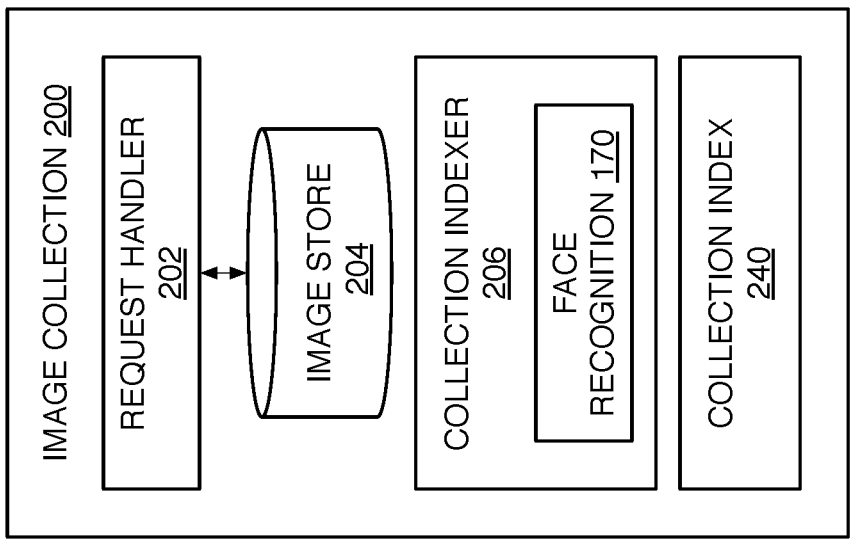
FIG. 4A is a block diagram of an exemplary embodiment of the image collection subsystem used in FIG. 2 responsible for indexing imaging content and providing the indexed data over a network to a display device.
Figure 4C:
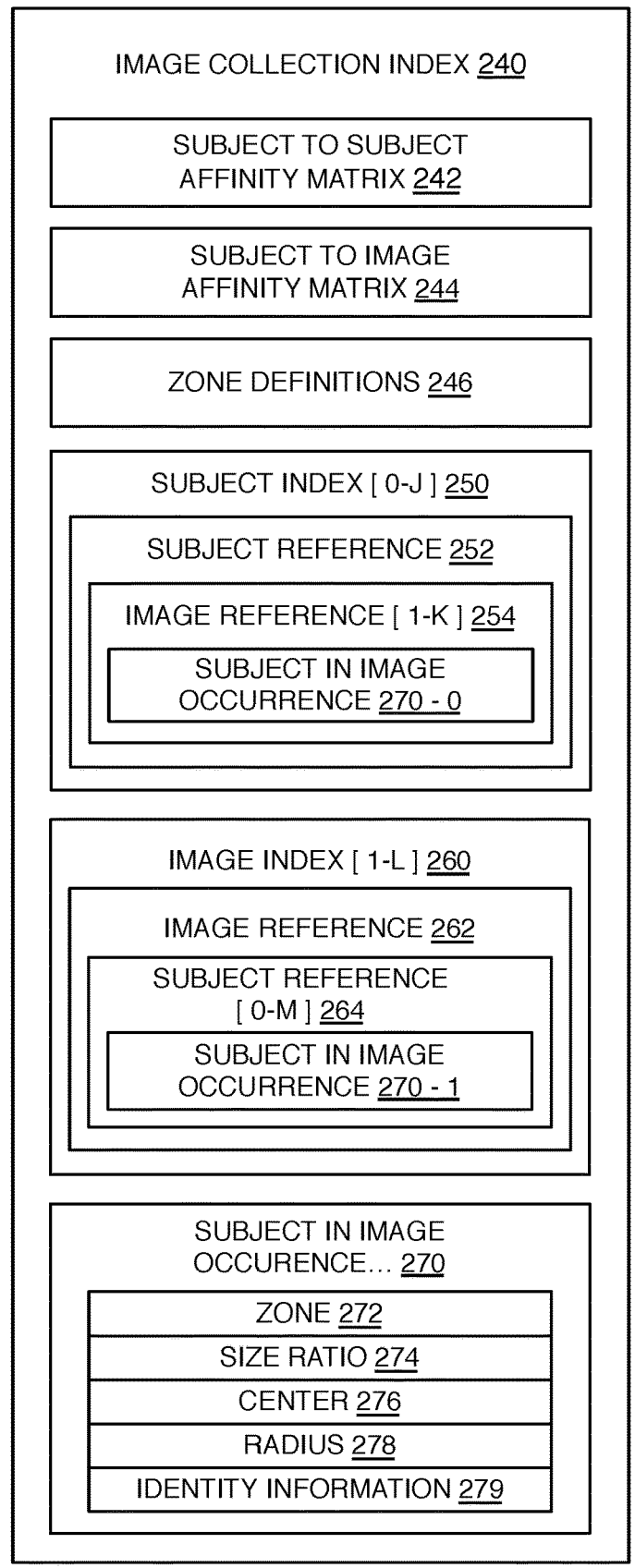
FIG. 4C is a block diagram of an exemplary embodiment of the data structure used to represent a digital image collection index as used in FIG. 4A.
Figure 4D:
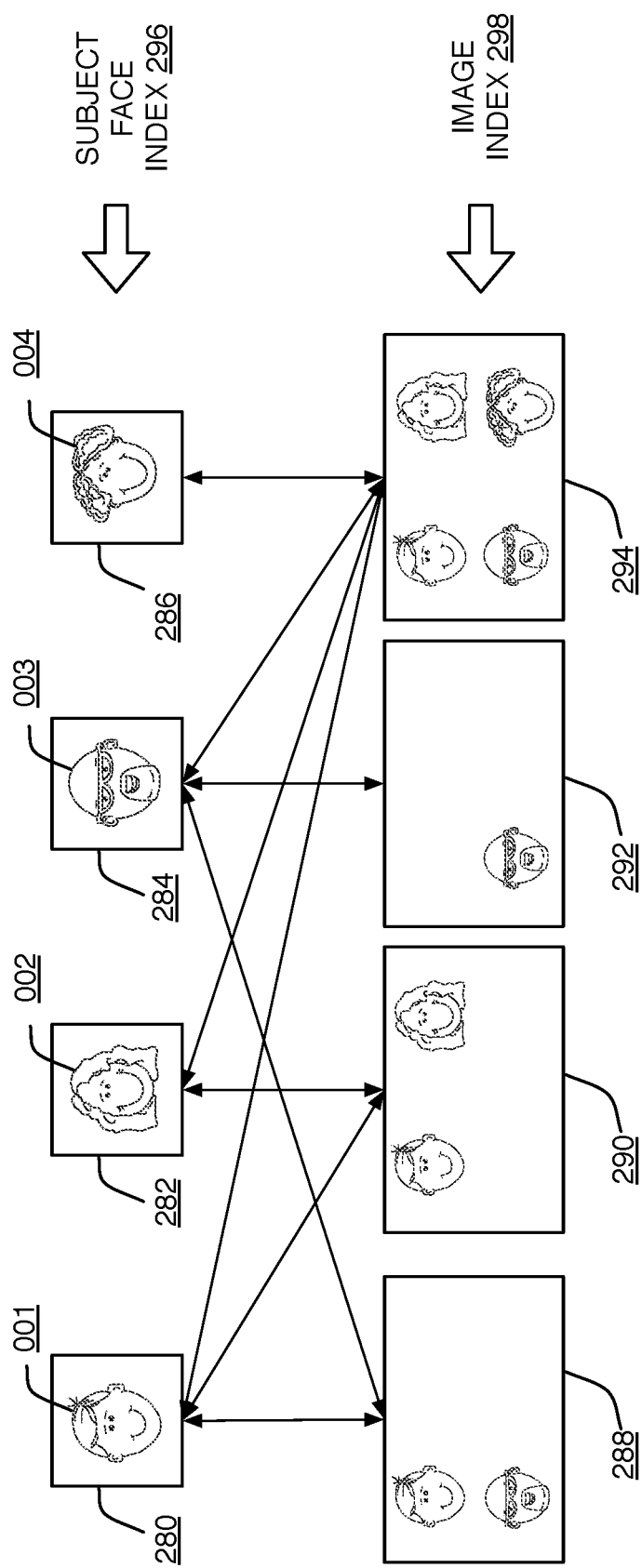
Figure 5A:
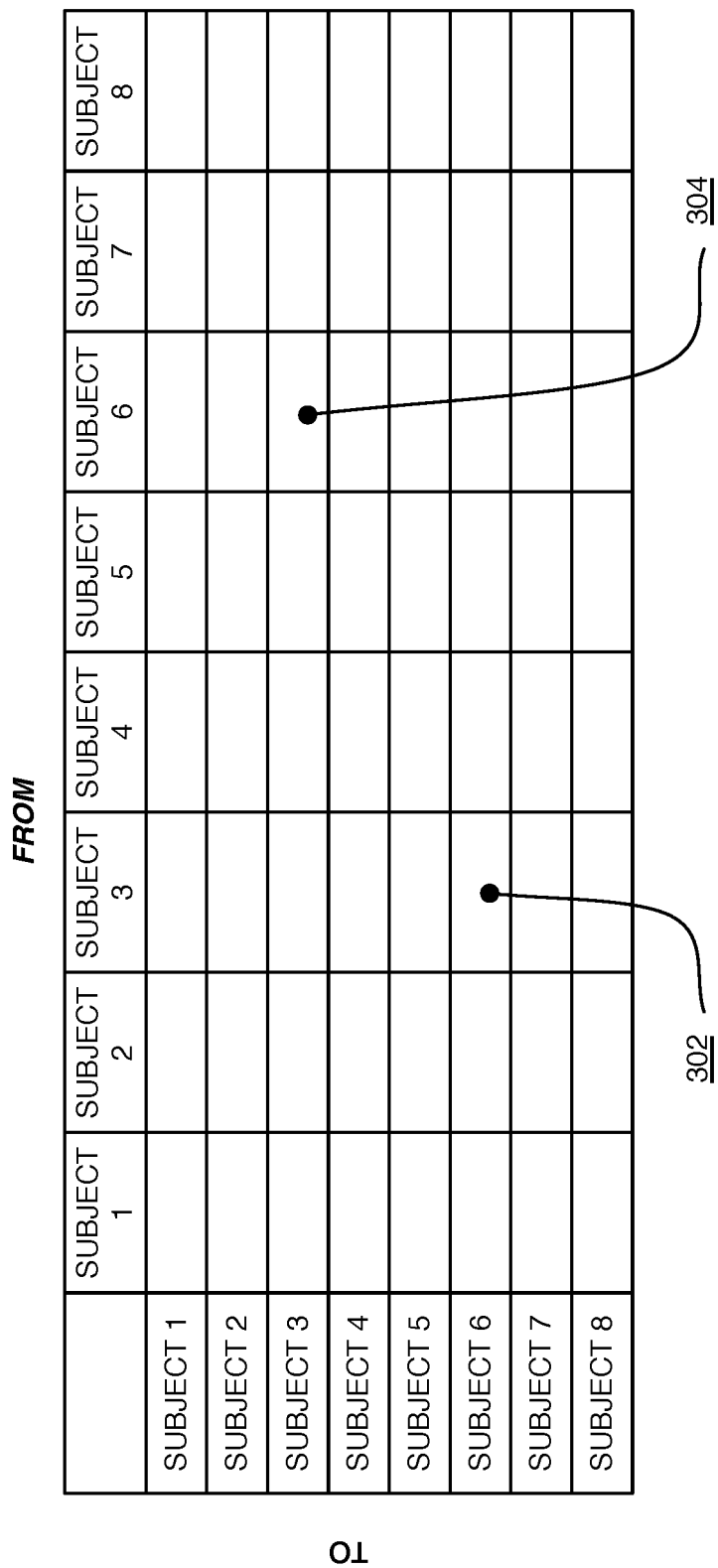
Figure 6:
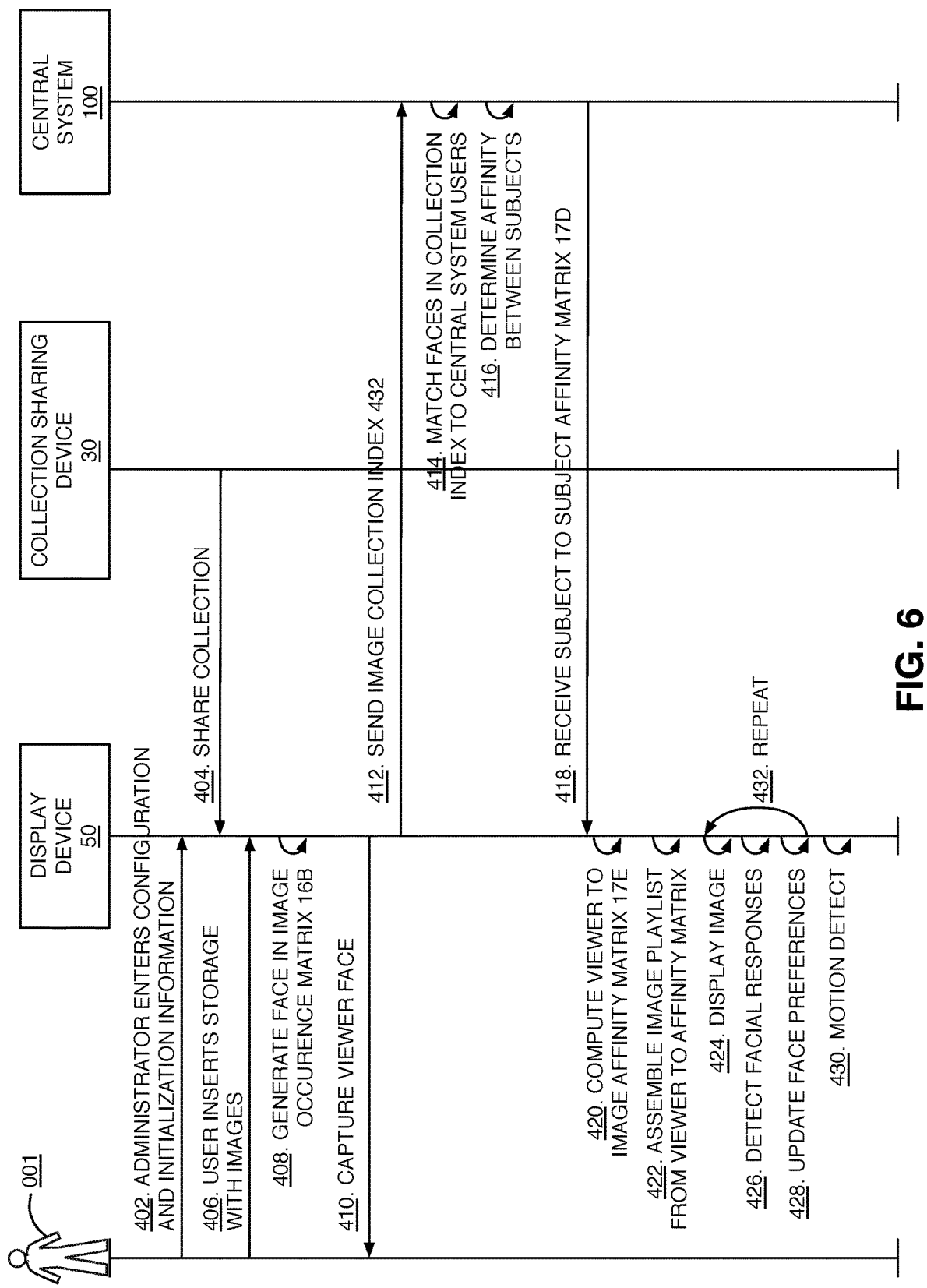
Figure 7:
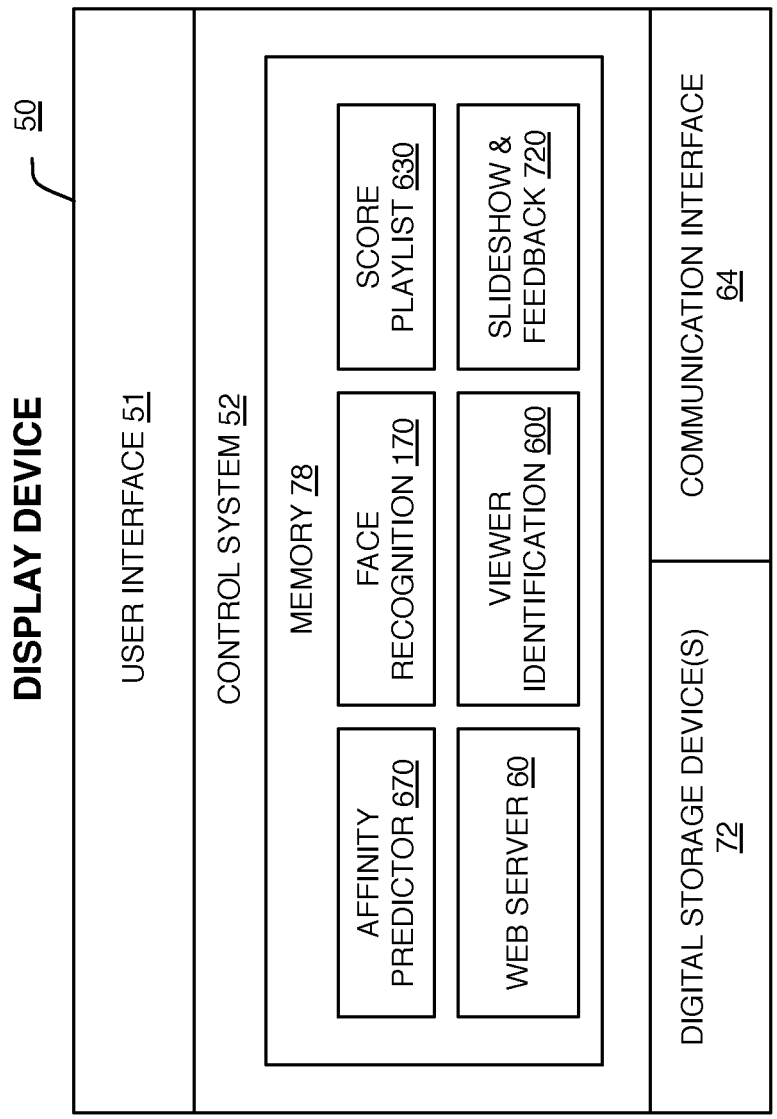
Figure 8:
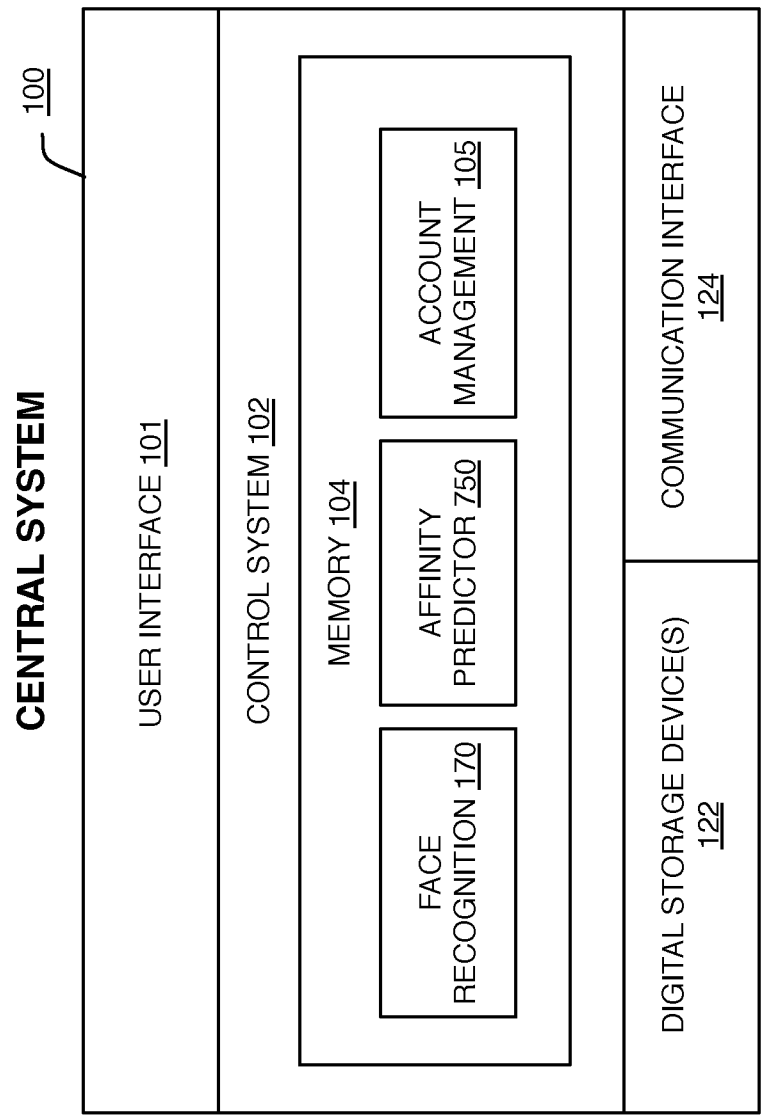
Figure 9:
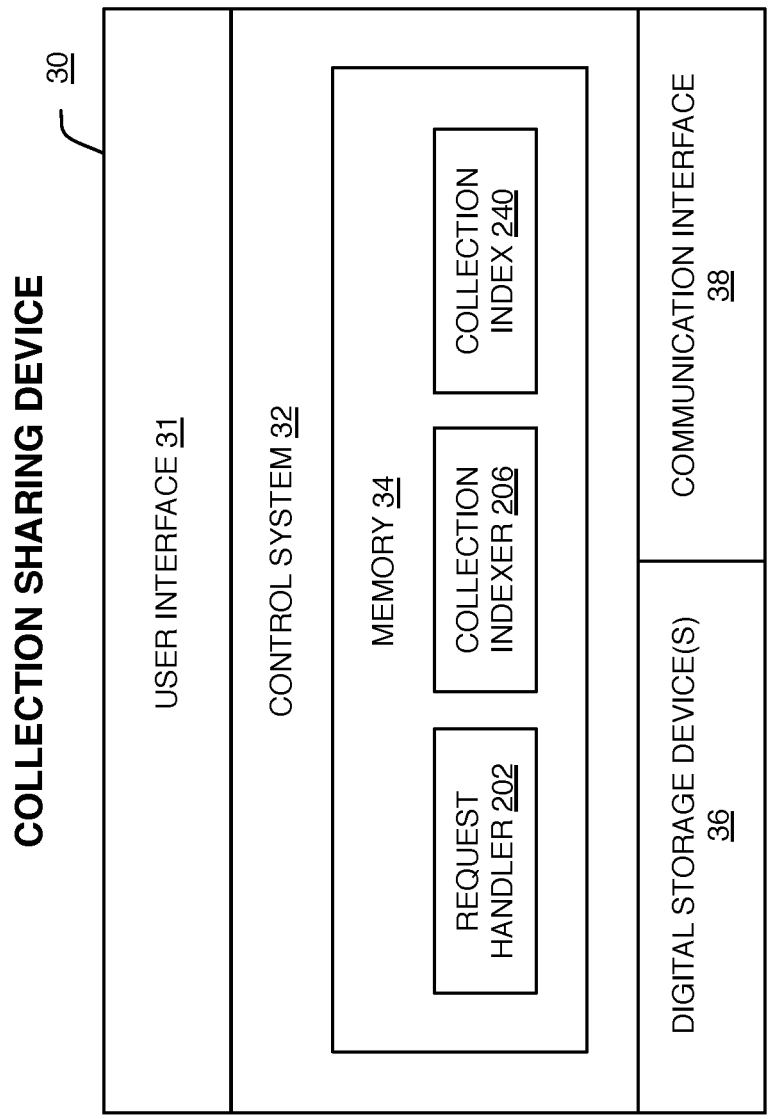
Figure 10A:
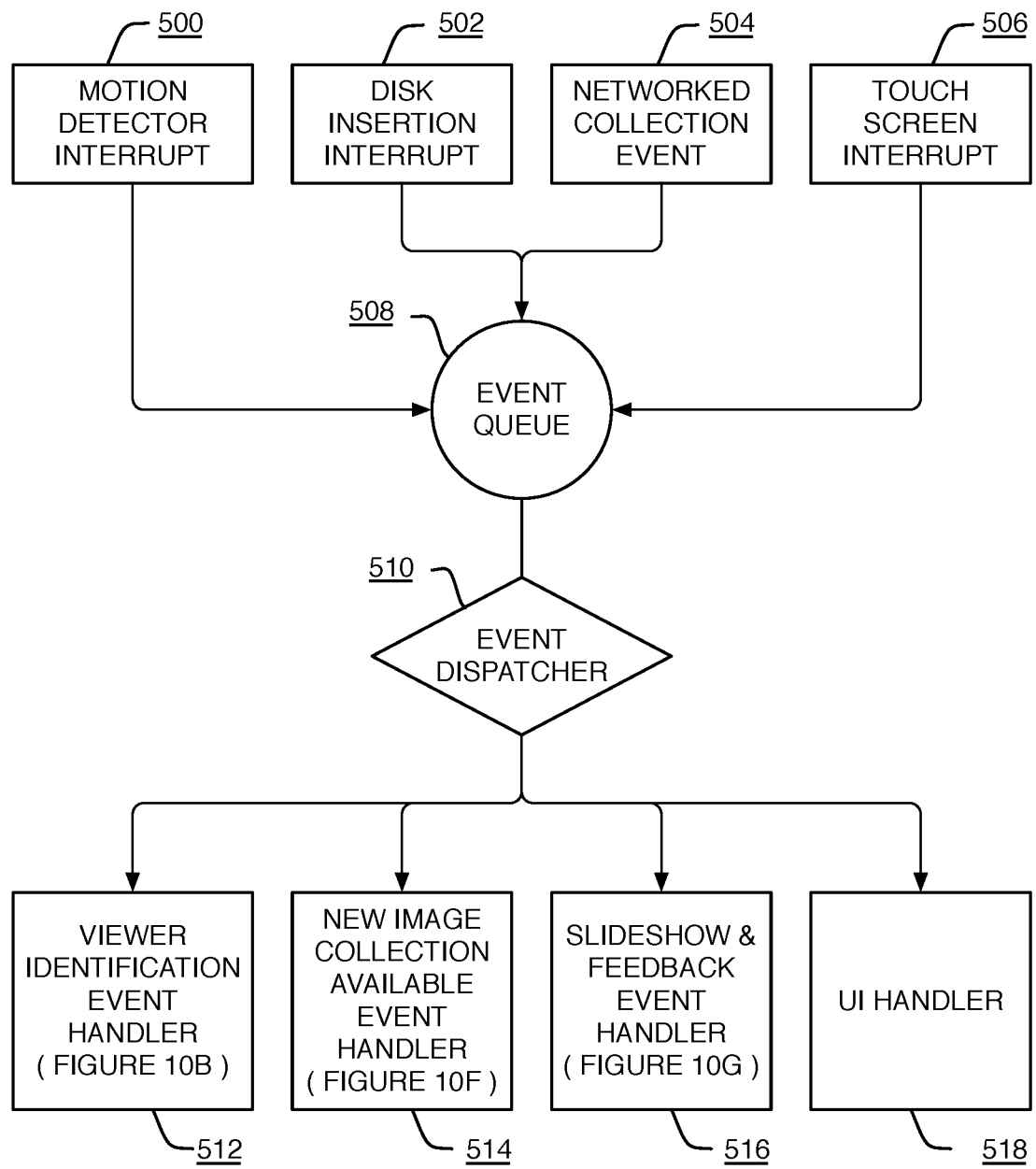
Figure 10B:
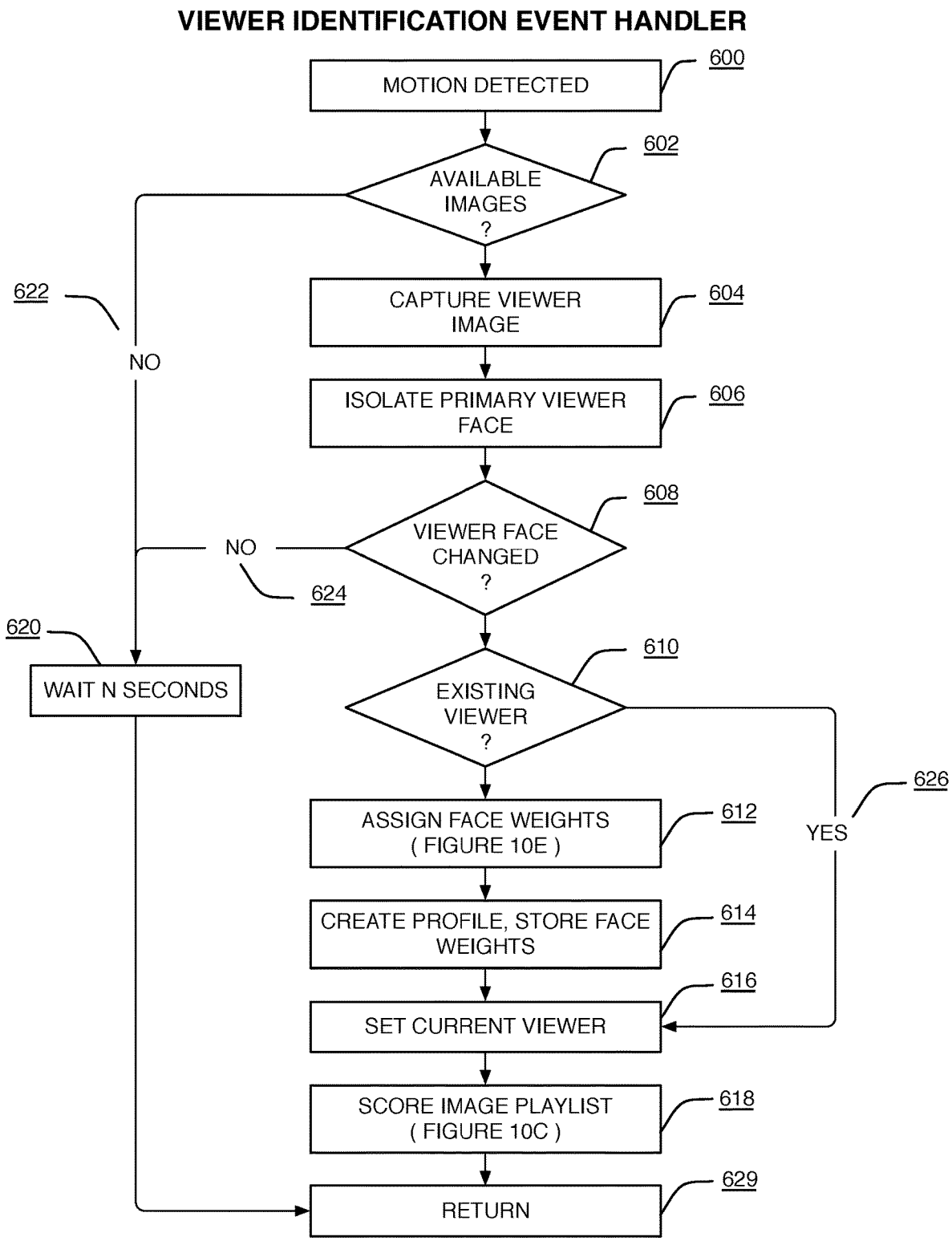
Figure 10C:
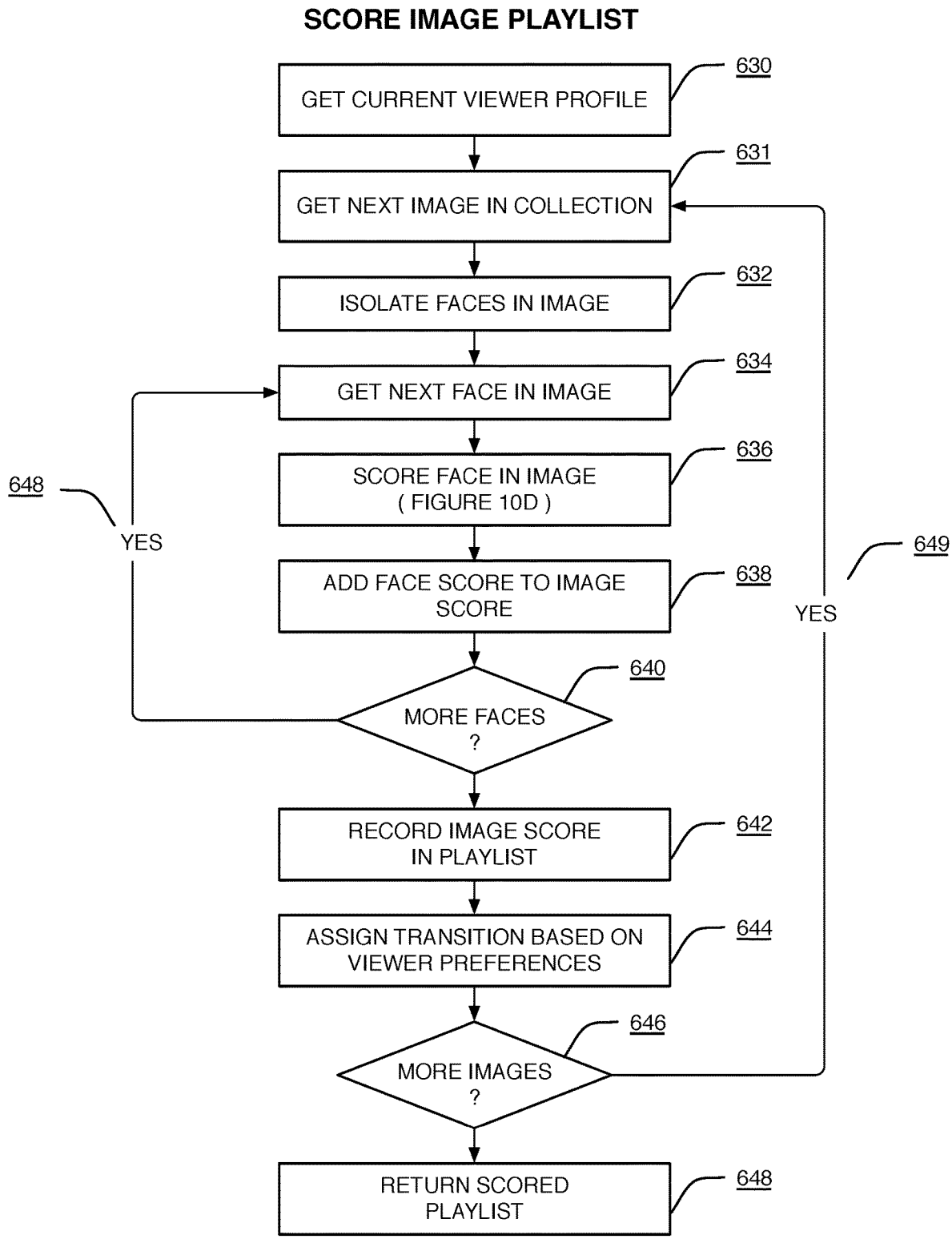
Figure 10D:
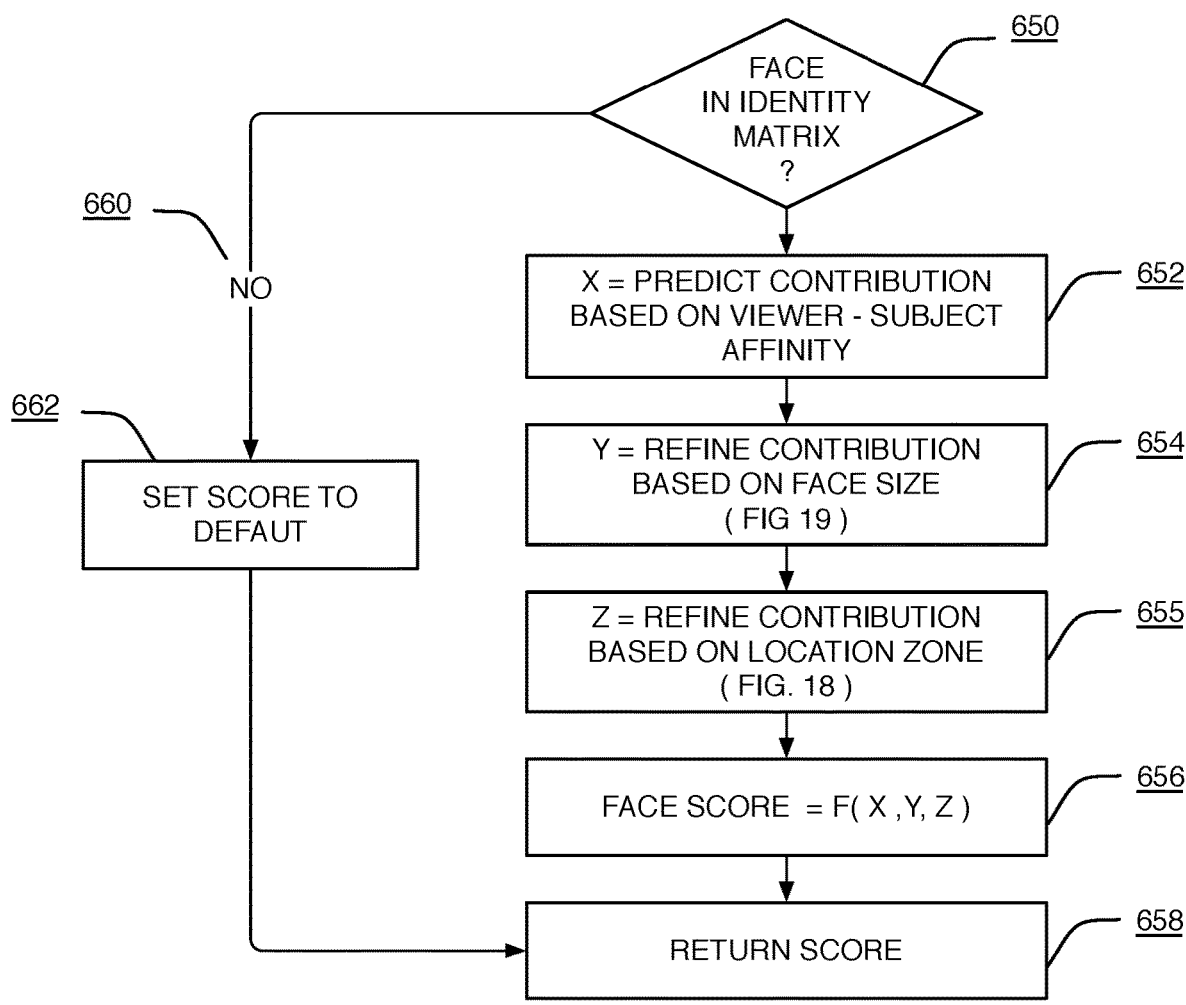
Figure 10E:
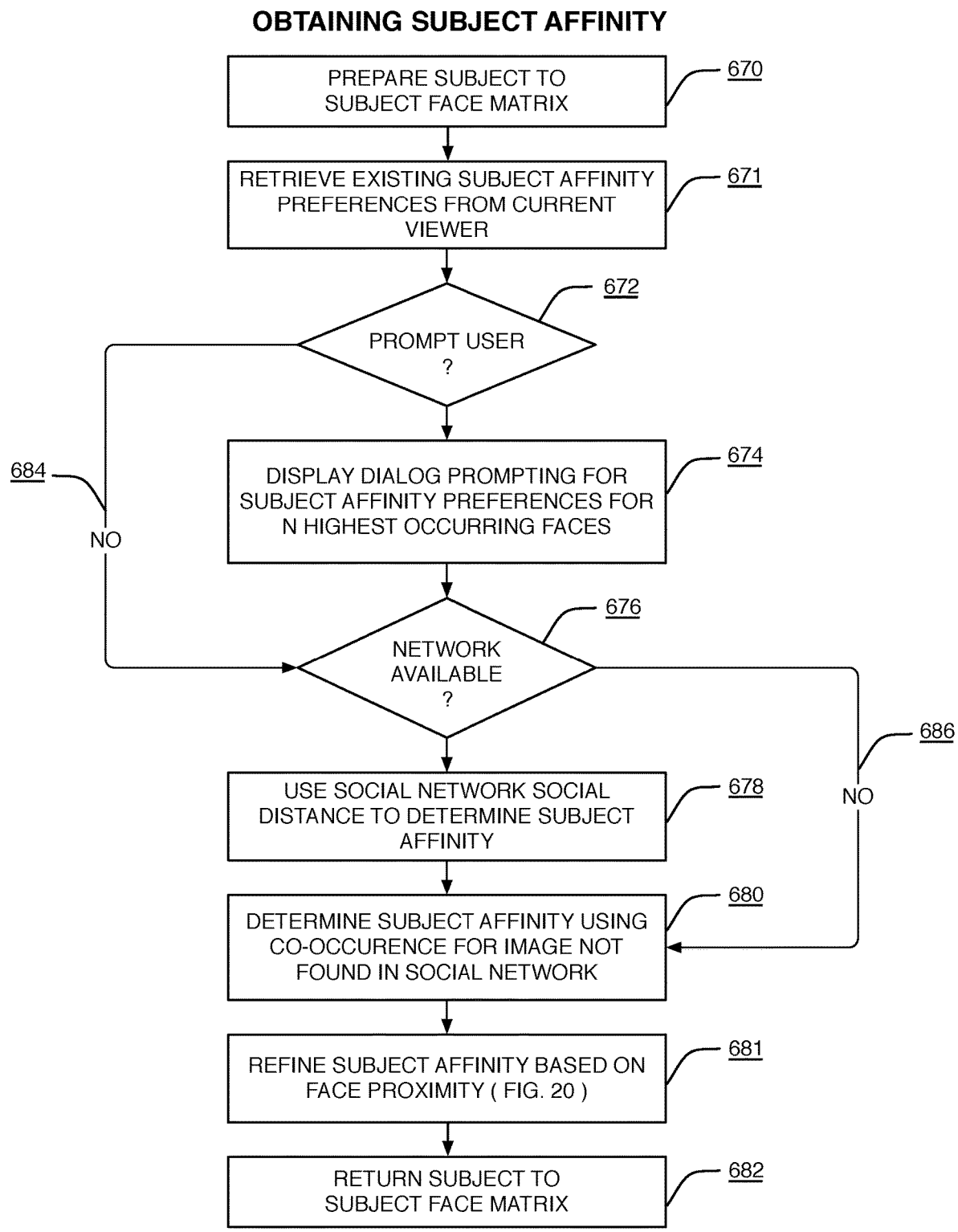
Figure 10F:
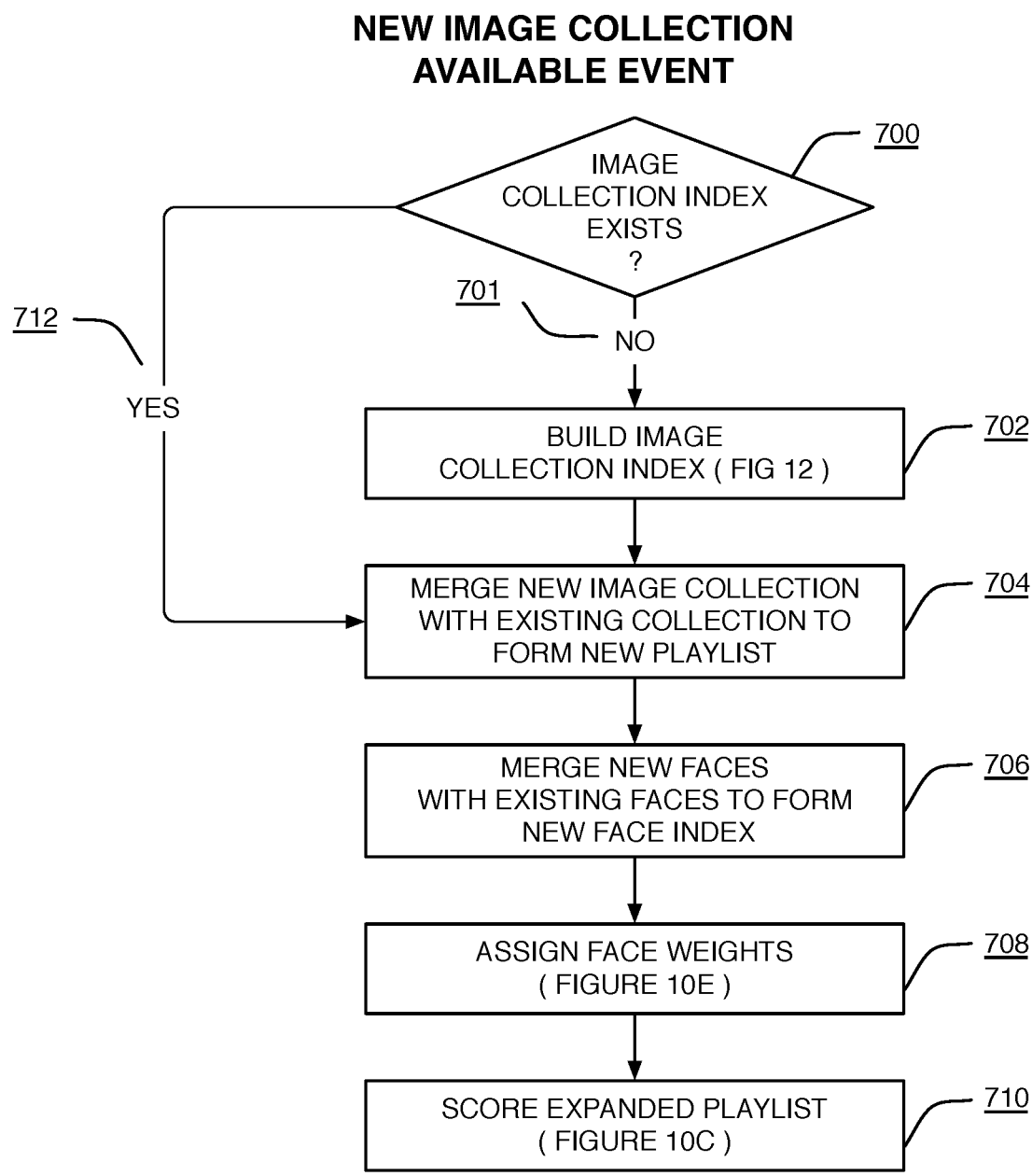
Figure 10G:
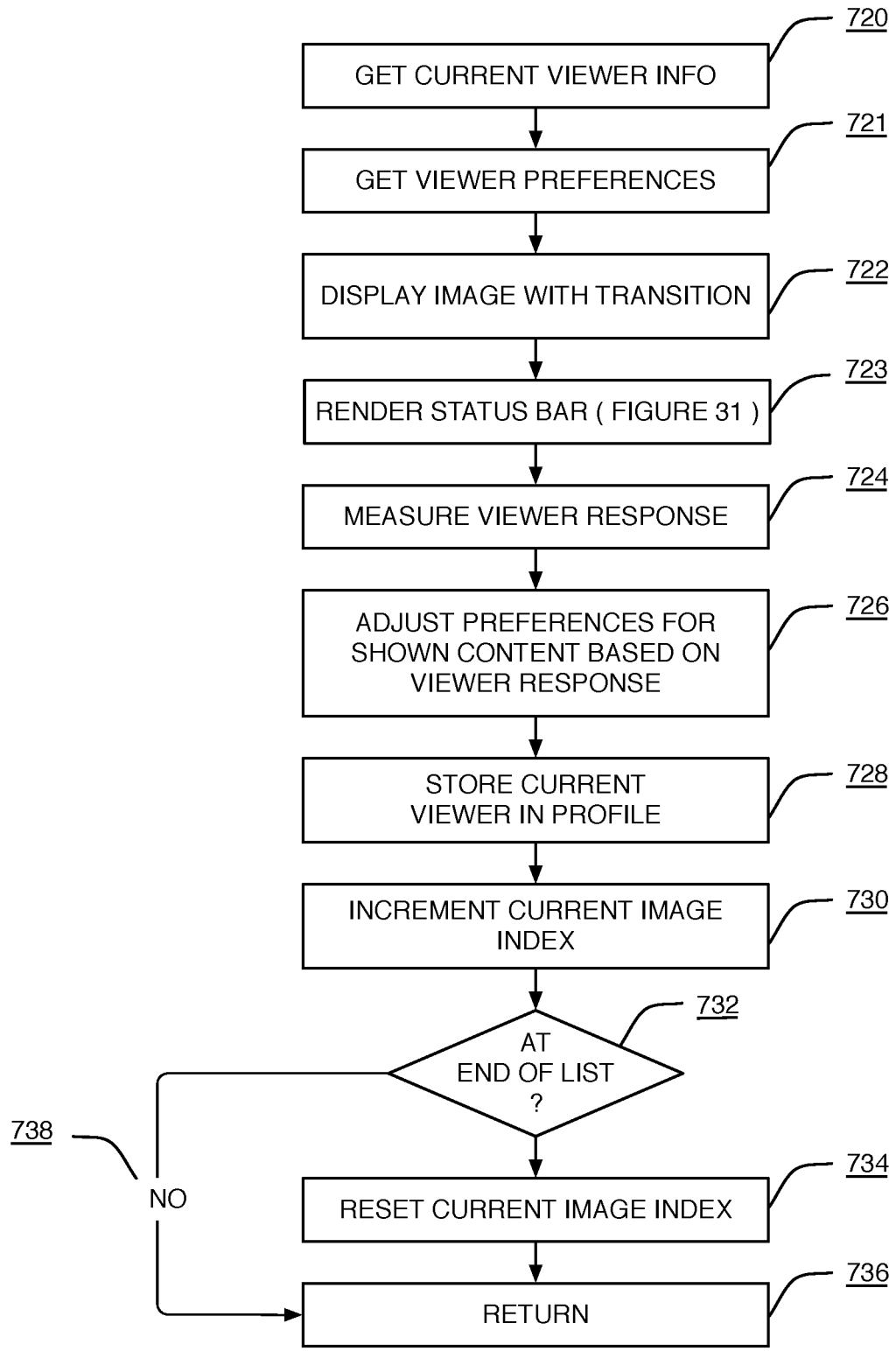
Figure 11A:
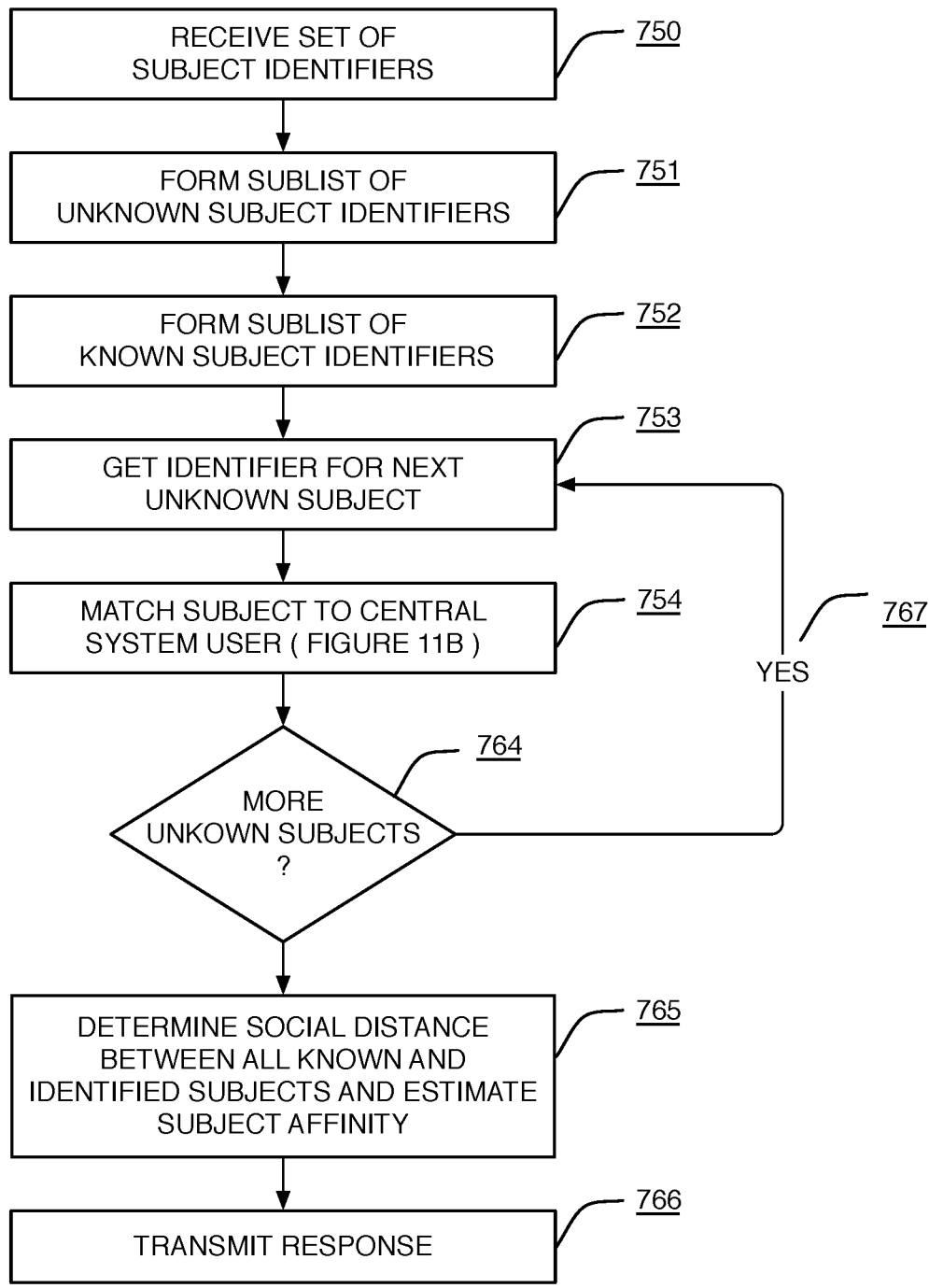
Figure 11B:
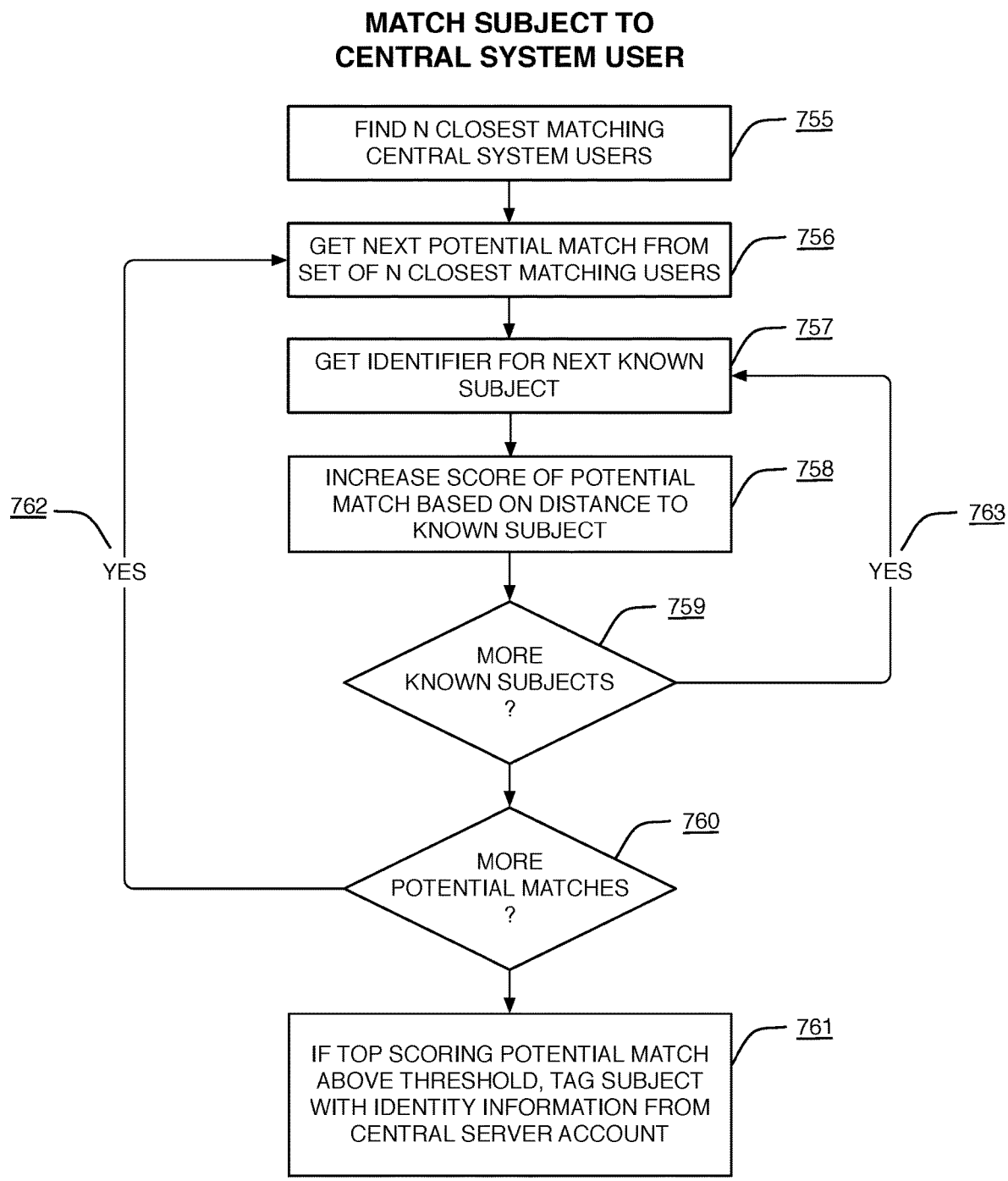
Figure 11C:
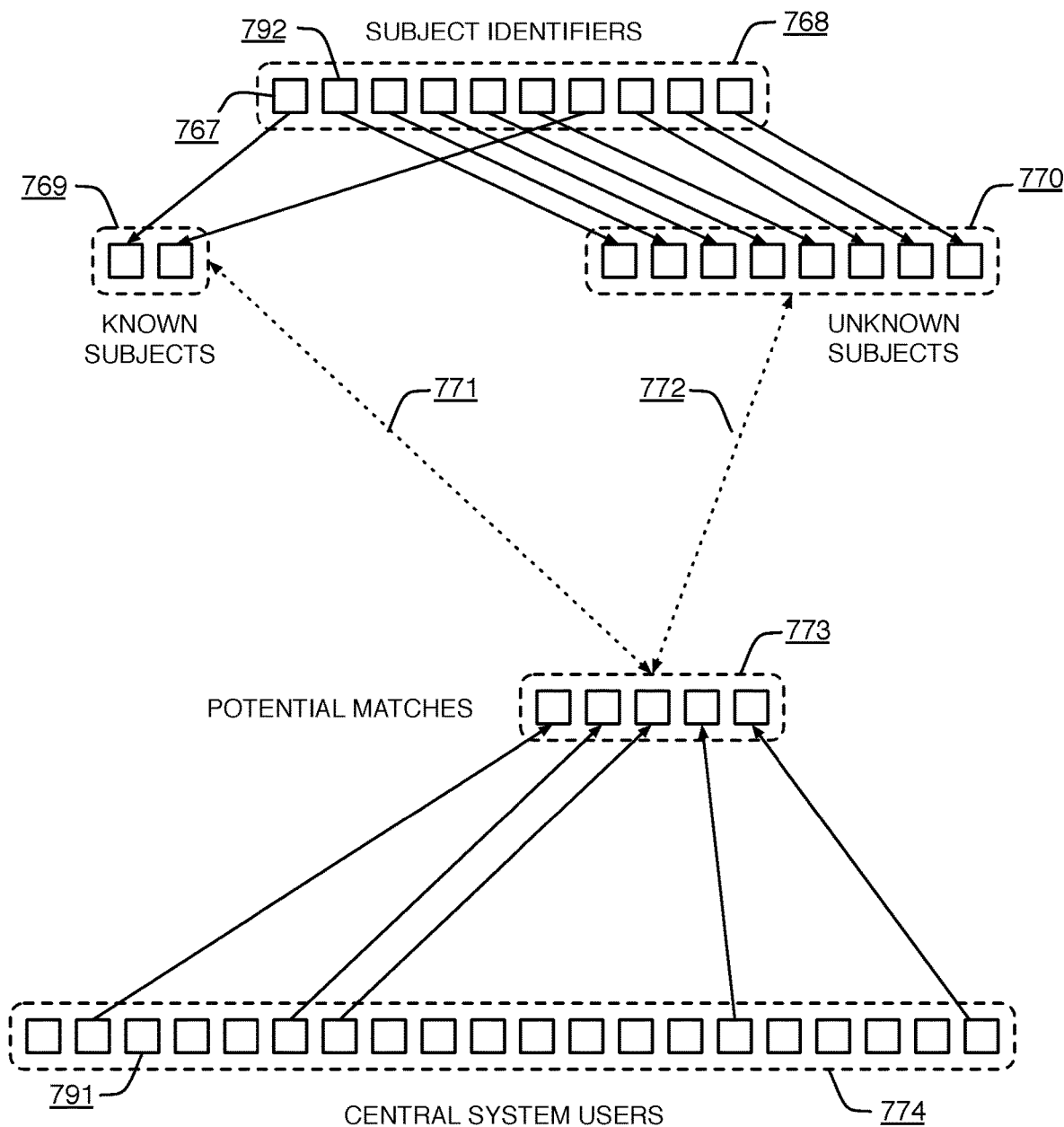
Figure 12A:
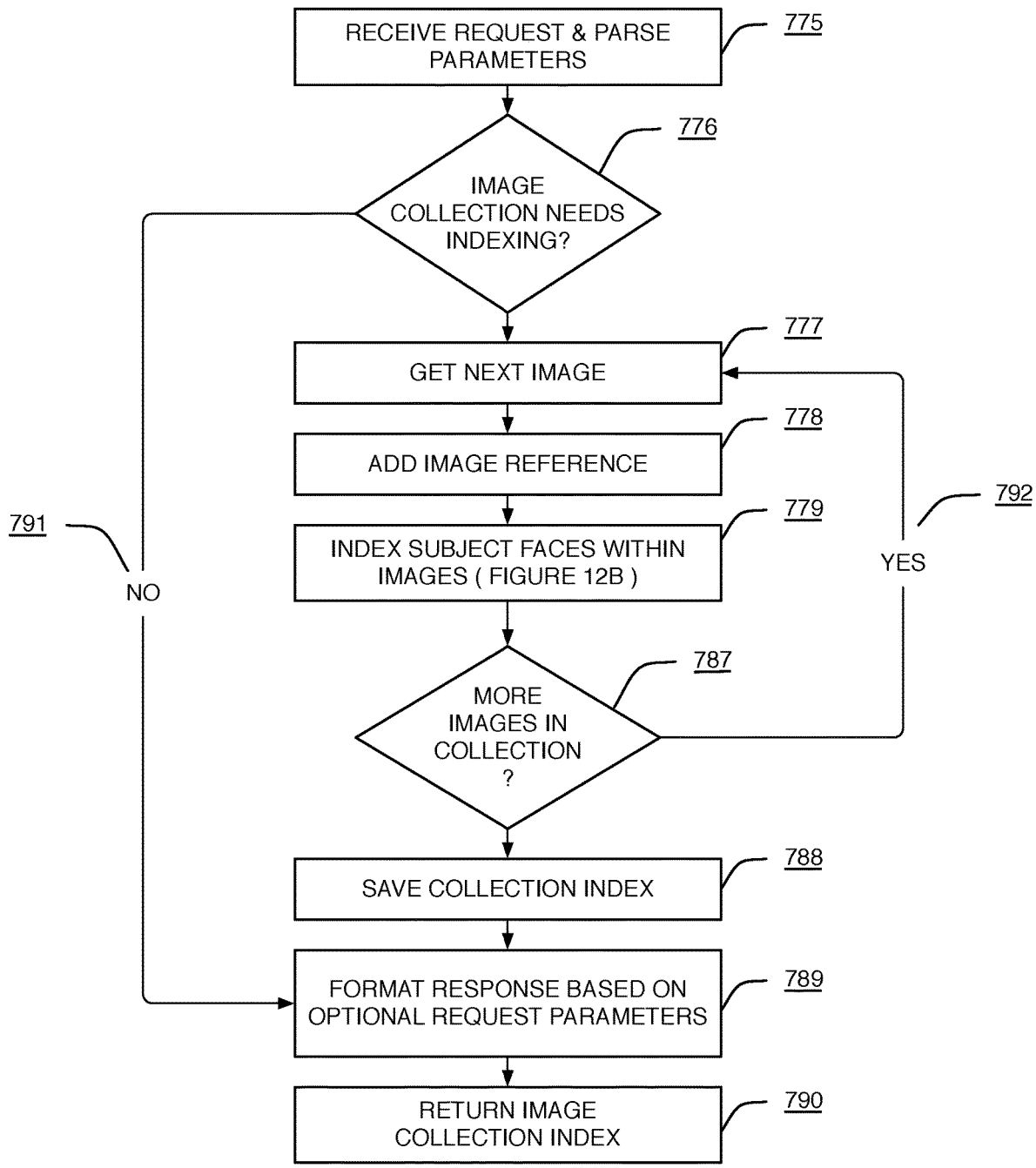
Figure 12B:
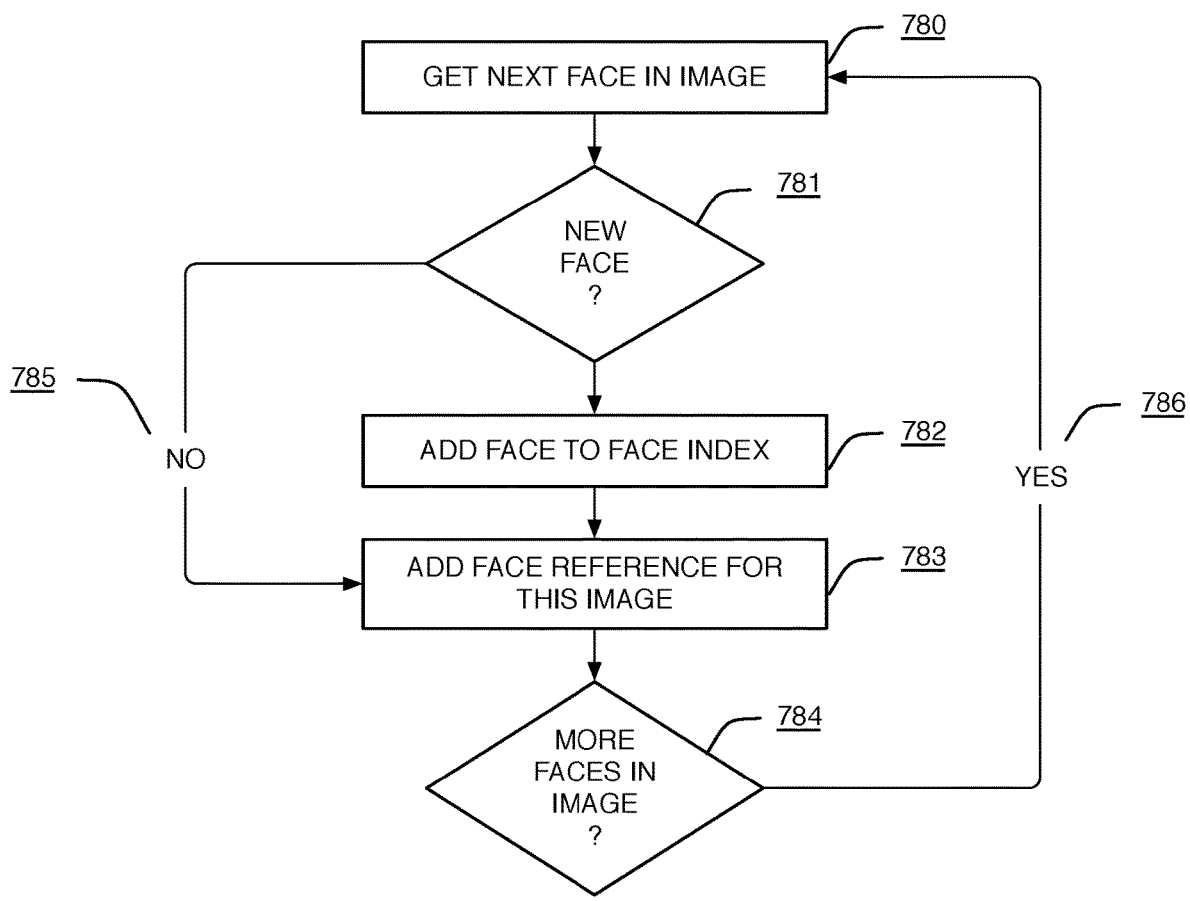
Figure 13:
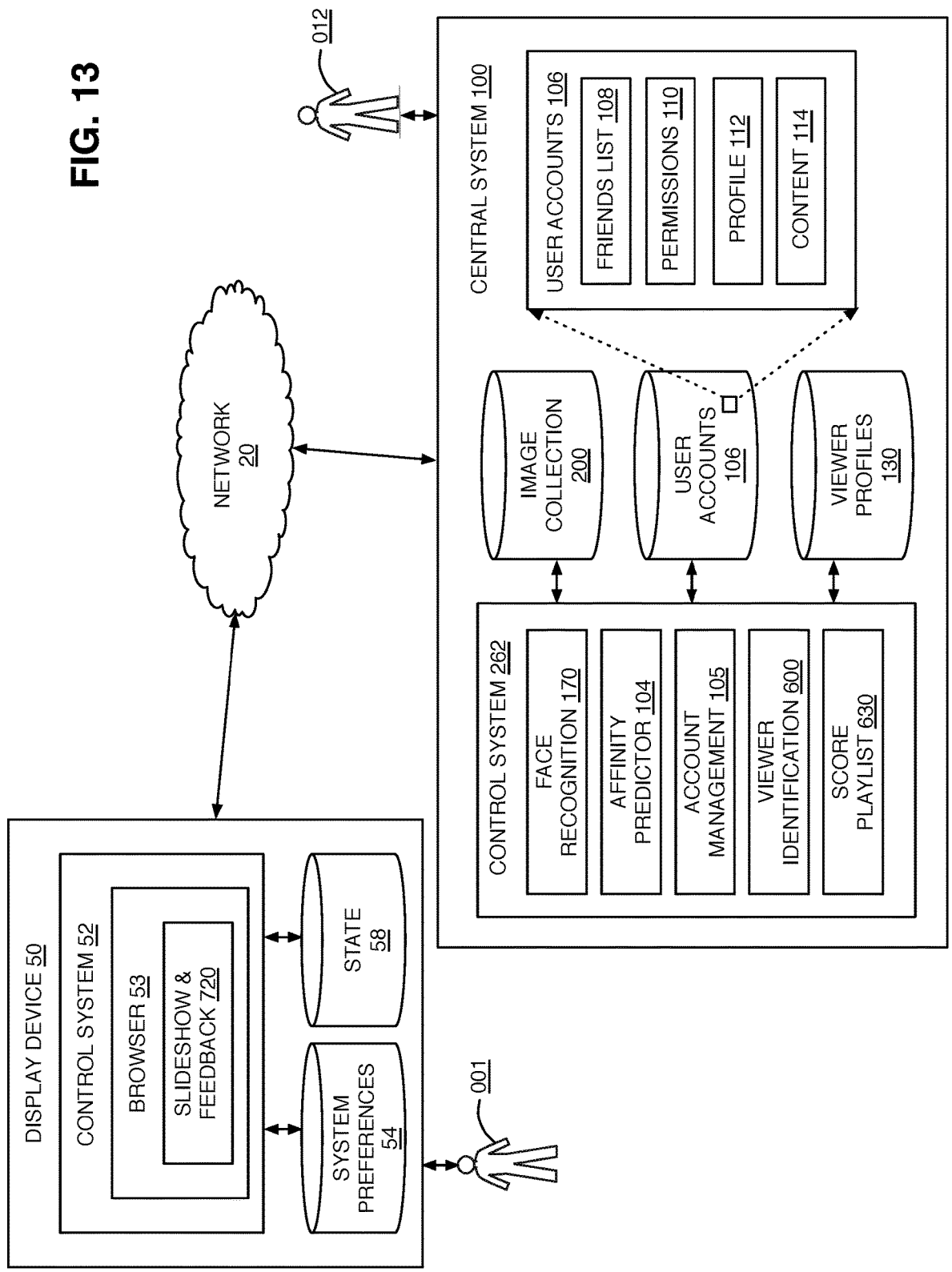
Figure 14A:
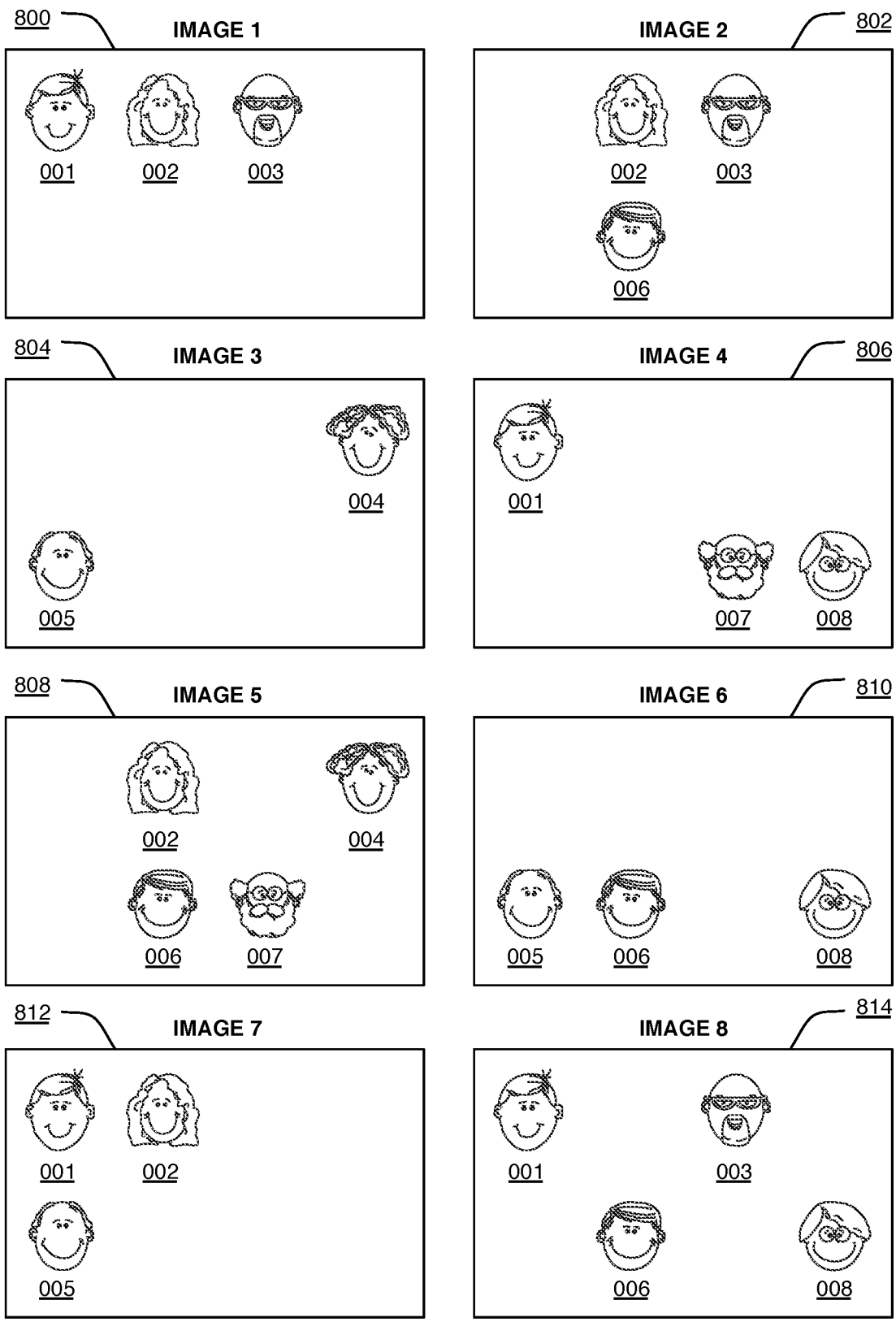
Figure 15A:
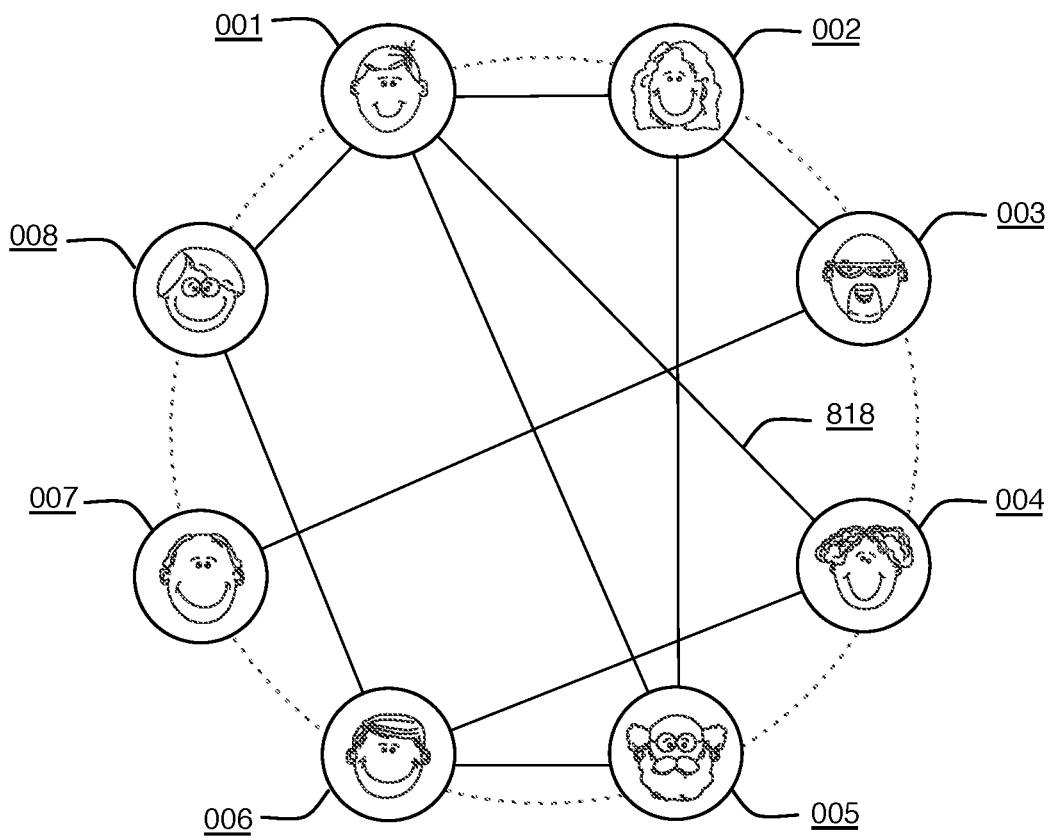
Figure 17:
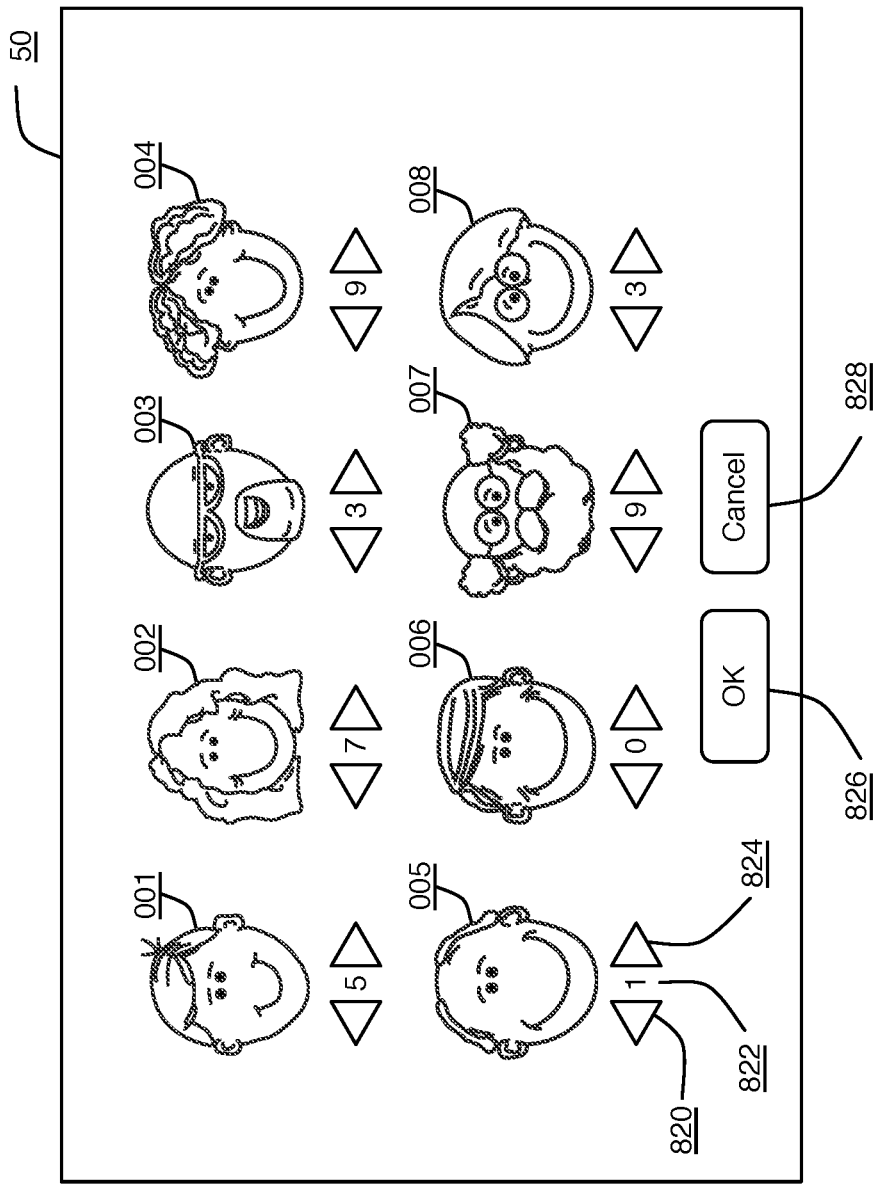
Figures 18A, 18B:
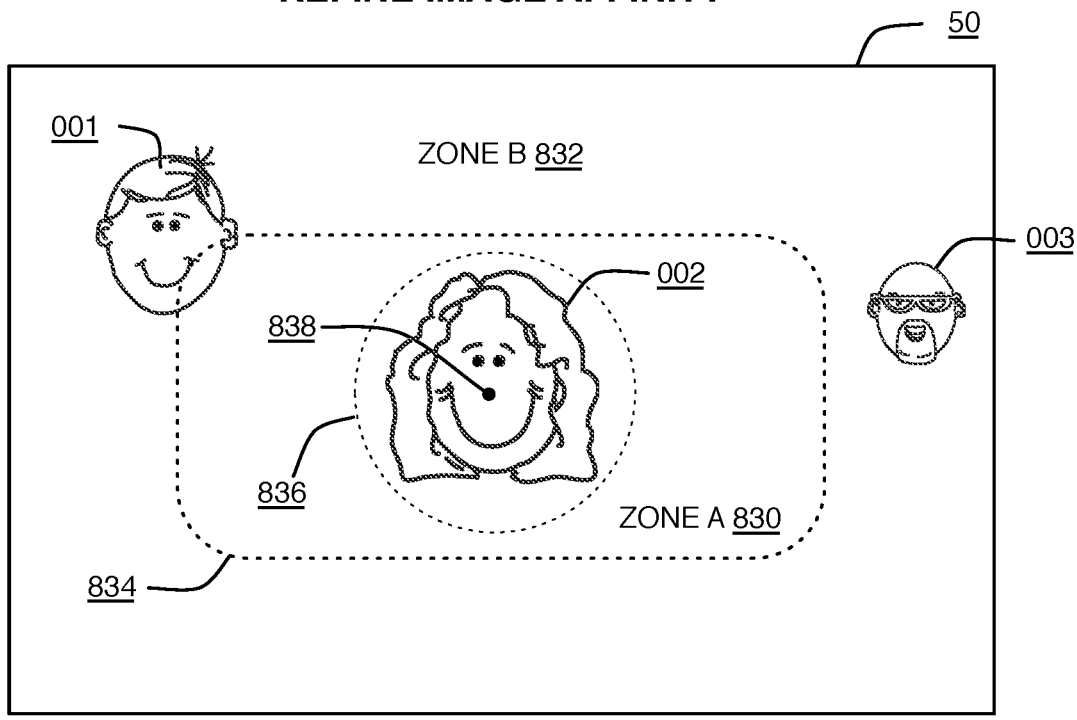
Figures 19A, 19B:
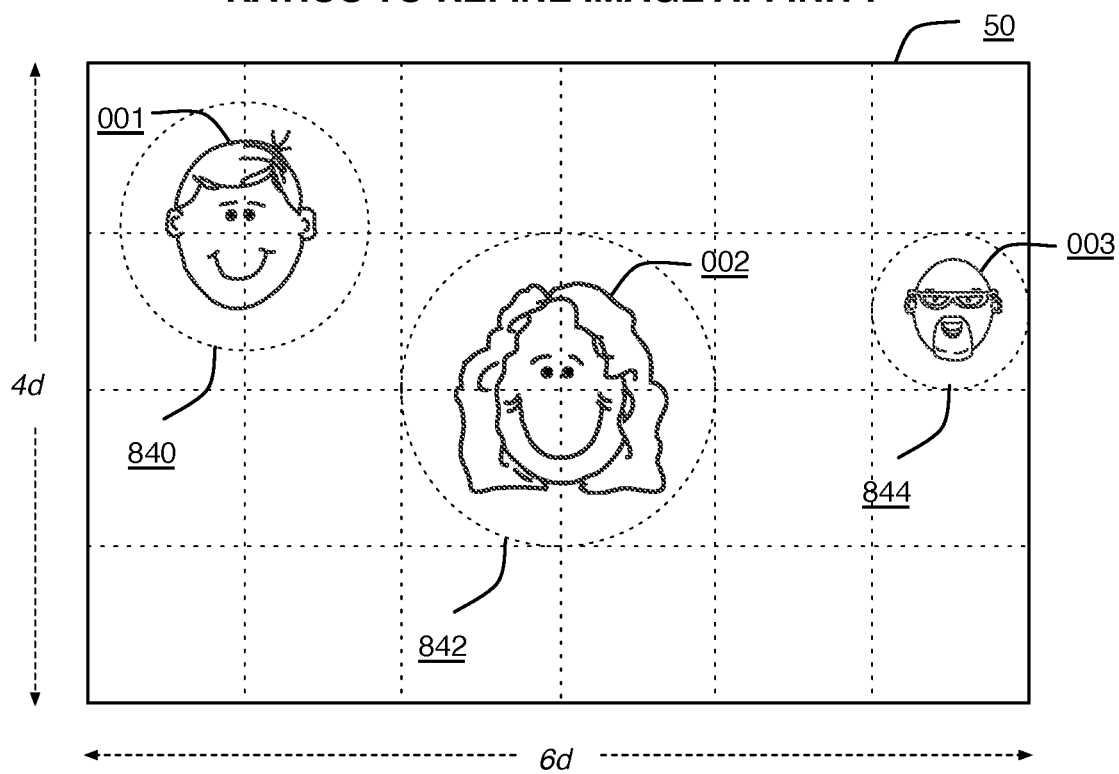
Figures 20A, 20B:
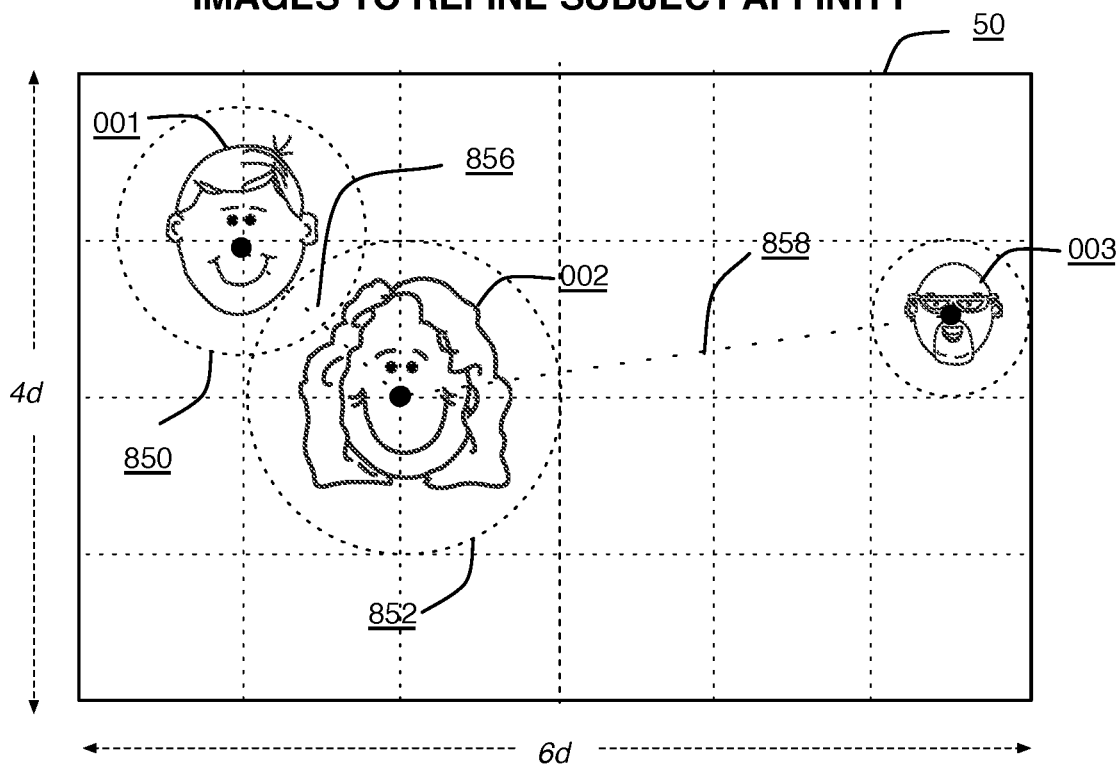
Figure 21:
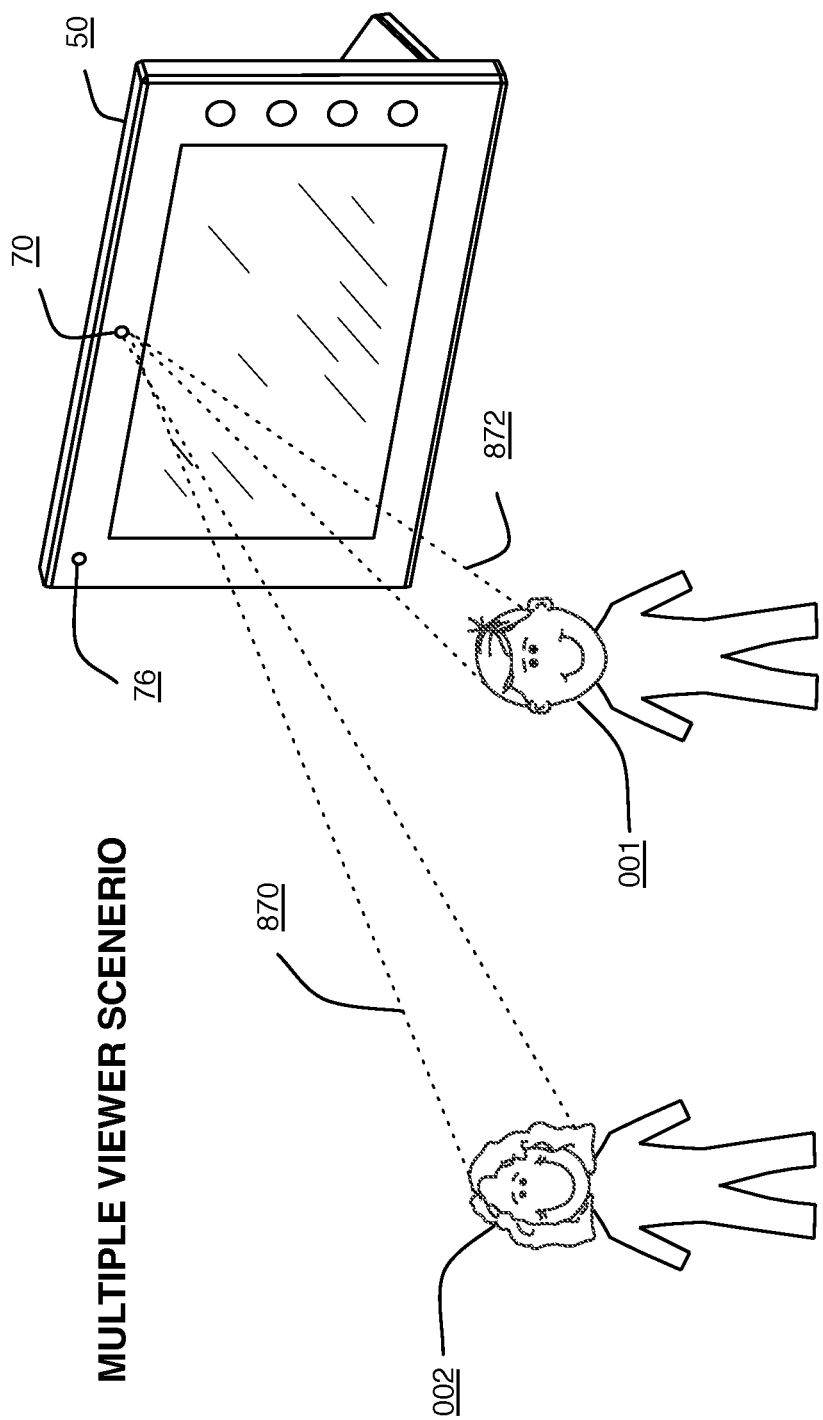
Figure 22:
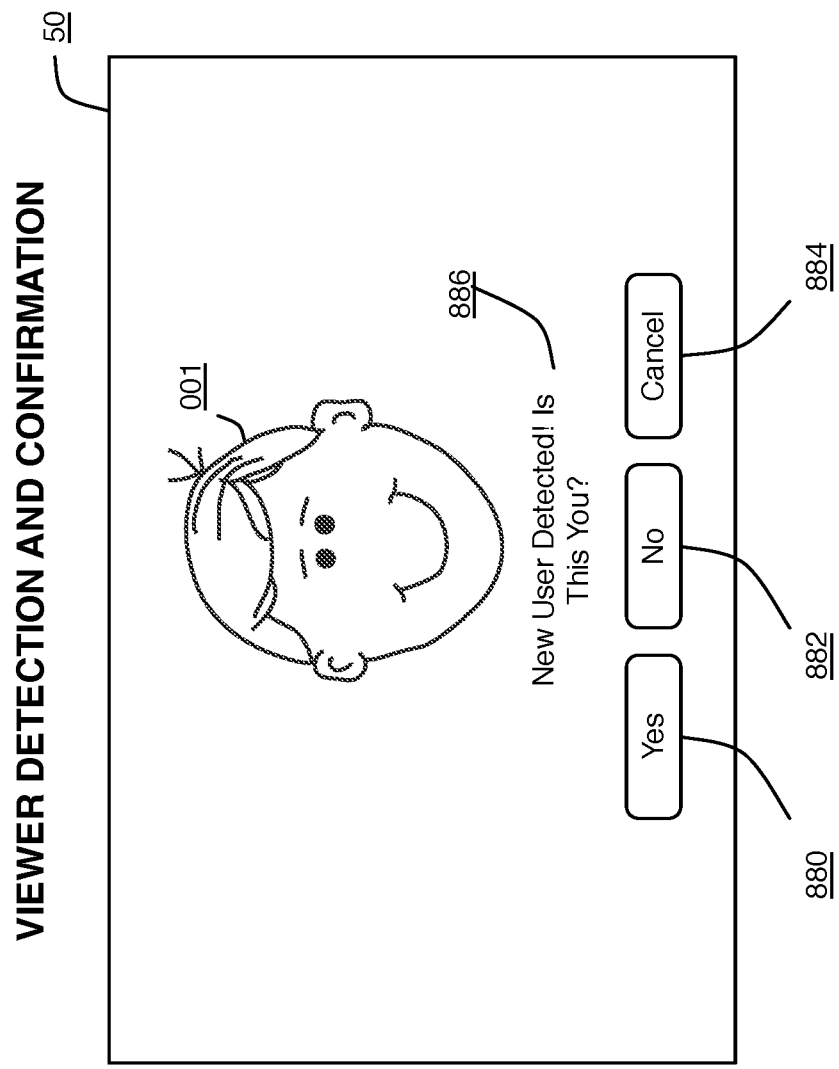

FIG. 4D graphically illustrates an exemplary image collection indexed by both subject and image;

FIG. 5A is a block diagram of an exemplary embodiment of the data structure used to represent affinity information between subjects (subject affinity);

FIG. 5B is a block diagram of an exemplary embodiment of the data structure used to represent affinity information between subjects and images (image affinity);

FIG. 6 illustrates the operation of the system of FIGS. 1, 2, and 3 according to one embodiment of the present disclosure;

FIG. 7 is a block diagram of the display device of FIG. 2 according to one embodiment of the present disclosure;

FIG. 8 is a block diagram of the central system of FIG. 2 according to one embodiment of the present disclosure;

FIG. 9 is a block diagram of the collection sharing device of FIG. 2 according to one embodiment of the present disclosure;

FIG. 10A is a flow chart illustrating a process for processing events originating from both the user and display device in one embodiment of the present disclosure;

FIG. 10B is a flow chart illustrating a process identifying a viewer of the display device according to one embodiment of the present disclosure;

FIG. 10C is a flow chart illustrating a process for using affinity information to score an image playlist for a viewer according to one embodiment of the present disclosure;

FIG. 10D is a flow chart illustrating a process for scoring a single face when encountered during the process of scoring an image as found in FIG. 10C;

FIG. 10E is a flow chart illustrating a process for building the affinity matrix that is used to represent the strength of relationship between any two users of the system according to one embodiment of the present disclosure;

FIG. 10F is a flow chart illustrating a process for incorporating a newly available image collection with a possibly existing image collection according to one embodiment of the present disclosure;

FIG. 10G is a flow chart illustrating a process for displaying a slideshow on the display device according to one embodiment of the present disclosure;

FIG. 11A-B are flowcharts illustrating a process performed by the central system to match subjects to users of a central system;

FIG. 11C depicts an exemplary subject to central system user matching process of FIGS. 11A-B;

FIG. 12A-B are flowcharts illustrating a process performed by an exemplary embodiment of the image collection index generator;

FIG. 13 illustrates an alternate embodiment of the system found in FIG. 2, wherein the display device has been simplified with the face recognition, affinity prediction, and image hosting taking place at the central system;

FIG. 14A graphically illustrates an exemplary collection of digital images comprised of subject faces;

FIG. 14B is a table illustrating which subject faces are contained in which of the exemplary images;

FIG. 15A is a graphical illustration of an exemplary central system where users form connections to other users to facilitate the control of the sharing of information;

FIGS. 15B-F are exemplary calculations showing how each image is assigned a composite score for each viewer using social distance data obtained from the exemplary central system of FIG. 15A;

FIGS. 16A-D are exemplary calculations showing how each image is assigned a composite score for each viewer using face co-occurrence within the image data obtained from the exemplary image collection of FIG. 14A;

FIG. 17 is an exemplary graphical user interface for collecting subject affinity information from a viewer of a display device;

FIG. 18A graphically illustrates an exemplary digital image divided into zones, such that different weights may be assigned to different zones, for the purpose of modifying the image affinity scores based on faces being found in different zones;

FIG. 18B is a table illustrating exemplary zone weighting values for the exemplary digital image shown in FIG. 18A;

FIG. 19A graphically illustrates an exemplary digital image where the subject faces have been resolved and their respective areas determined, for the purpose of modifying the image affinity scores for faces based on their respective sizes;

FIG. 19B is a table illustrating exemplary weighting values for the exemplary digital image shown in FIG. 19A;

FIG. 20A graphically illustrates an exemplary digital image whereby the faces have been identified, and the distance between each face determined for the purpose of modifying the exemplary face co-occurrence scores of FIG. 16 based on the distance between each subject face pair;

FIG. 20B is a table illustrating exemplary weighting values for the exemplary digital image shown in FIG. 20A;

FIG. 21 graphically illustrates an exemplary display device wherein more than one viewer has been detected;

FIG. 22 graphically illustrates an exemplary graphical user interface for prompting a newly detected viewer to confirm identity, for the purpose of matching that viewer to an existing profile.

DETAILED DESCRIPTION OF THE EMBODIMENTS

The embodiments set forth below represent the necessary information to enable those skilled in the art to practice the disclosure and to illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a display device 50 capable of identifying a viewer 001, and customizing the content shown on the display device 50 to that viewer 001. The viewer 001 is identified through a detection process that is initiated when the viewer 001 triggers the motion detection subsystem 76 on the display device 50. An image of the viewer 001 is then captured using the image capture subsystem 70 on the display device 50. The face of the viewer 001 is resolved and a viewer profile 130 is generated where a reference to the corresponding face is stored 134. In one embodiment, the images selected for display on the device are determined by selecting those images in which the viewers face 001 is detected. Further to the present disclosure, the viewer 001 interacts with the display device 50 through the use of a touchscreen 66 on the front of the display device 50. In another embodiment, the viewer would interact with the display device 50 through the use of the button controls 90 92 94 96 on the chassis of the display device 50

It should be noted that while the shown embodiment of the display device 50 is a digital picture frame, there are other hardware configurations that would prove suitable for practicing the disclosure. Other embodiments would include a personal computer with camera, a laptop with integrated camera, a cellular telephone with integrated camera, a surveillance monitor with networked surveillance cameras, a digital camera with LCD, a PDA with digital camera, a media player with digital camera, and the like.

FIG. 2 illustrates a collection sharing device 30 for providing additional content to a display device 50 over a network 20, and a central system 100 for providing affinity information between subjects found in the image collection 200. The display device 50 is communicatively coupled via a network 20 to additional image sources 30. The additional image sources may include other display devices, computers, cellular phones, or any device possessing the necessary electronic hardware and software. Additional image content may also be retrieved from image sources residing 200 within the central system 100 and available over the internet. Examples of such central systems 100 may include photosharing sites and social networking sites with photo storage capabilities. Examples of photosharing sites include Shutterfly, Flickr, and Snapfish. Examples of social networking sites with photosharing capabilities include Facebook, Myspace, and Classmates.com. In this embodiment of the disclosure, the display device 50 also retrieves relationship information from one or more central systems 100. The relationship information is used to compute subject affinity scores, which in turn are used to select which images will be presented to the viewer 001.

As stated above, the network 20 is preferably a distributed, public access network, such as the Internet, wherein the user system 50 and the central system 100 are capable of interacting with and through the network 20 using various protocols such as Transmission Control Protocol/Internet Protocol (TCP/IP), Hypertext Transport Protocol (HTTP), and File Transfer Protocol (FTP). However, those of ordinary skill in the art will appreciate that the network 20 is not limited thereto. More specifically, the network 20 may be any type of network suitable to allow interaction between the display device 50 and the central system 100. For example, the network 20 may be a wired network, a wireless network, or any combination thereof. Further, the network 20 may include a distributed computing network, an intranet, a local-area network (LAN) and/or a wide-area network (WAN), or any combination thereof.

In one embodiment, the central system is comprised of a control system 102 that controls the functions of the system. The control system 102 contains a affinity predictor 750 that uses facial recognition 170 to establish matches between subjects found in the images 220 in the image collection 200 and users 012 of the central system 100. The relationships of the users 012 of the central system 100 are managed through the account management 105 function.

This exemplary central system 100 is comprised of multiple user accounts 106. Each user account corresponds to a single user 12 of the central system 100. Each user account 106 contains a list of friend's 108, permission settings 110, profile information 112, and content associated with the user 114. The Friends List 108 is built through an invitation process where other users 012 are invited to form a reciprocal relationship or connection. The entries in the friend's list 108 may be tagged with optional information qualifying the nature of the relationship, and information indicating the duration of the relationship. The permission settings 110 are used to control access to profile 112 and content information 114 by other accessing entities. Accessing entities of the central system 100 may include both member and nonmember users 012.

The profile information 112 may include information such as demographic information, preference information, calendar information, location history, communications history, and the like. The location history for a user 012 may be built up by extracting the information directly from the user 012, or by extracting location information and timestamps from images 220 in which the central system 100 user 012 appears. An example of the user 012 directly submitting location history would include automated submissions by the users 012 cellular phone with GPS capabilities to the central system 100. The location history would be comprised of entries capturing both the location and time of the user 012. Based on the location history for each user 012, an average position for each user 012 may be calculated. Additionally, the average position of a user 012 may be time varying, and the average position for the user 012 is calculated over one or more windows of time.

A communications history log would capture communications events comprised of the time and type of communication, as well as extracted features from the communication. An example of extracted features would include using natural language processing to extract the most descriptive keywords from a message sent between central system 100 users 012. Based on the communication event log, other statistics may be computed, such as a frequency of communication.

Content 114 may include text, audio, image, and video information uploaded by a user 012 to the central system 100. The central system 100 may also function as an additional source of image content 200.

The collection sharing device 30 is comprised of an image collection 200 that is responsible for the storage and transfer of the images 220, a control system 32 for making the image collection 200 available over the network 20, and a browser 34 for providing configuration information to the display device 50.

It should be noted that while we have explicitly described a collection sharing device 30 as a remote content source, any electronic device capable of performing the functions required by the image management 200 and control system 32 are capable of functioning as remote content sources. This also includes the central system 100 and display device 50. Additional detail for the collection sharing device 30 can be found in FIG. 9.

Figure 3A:
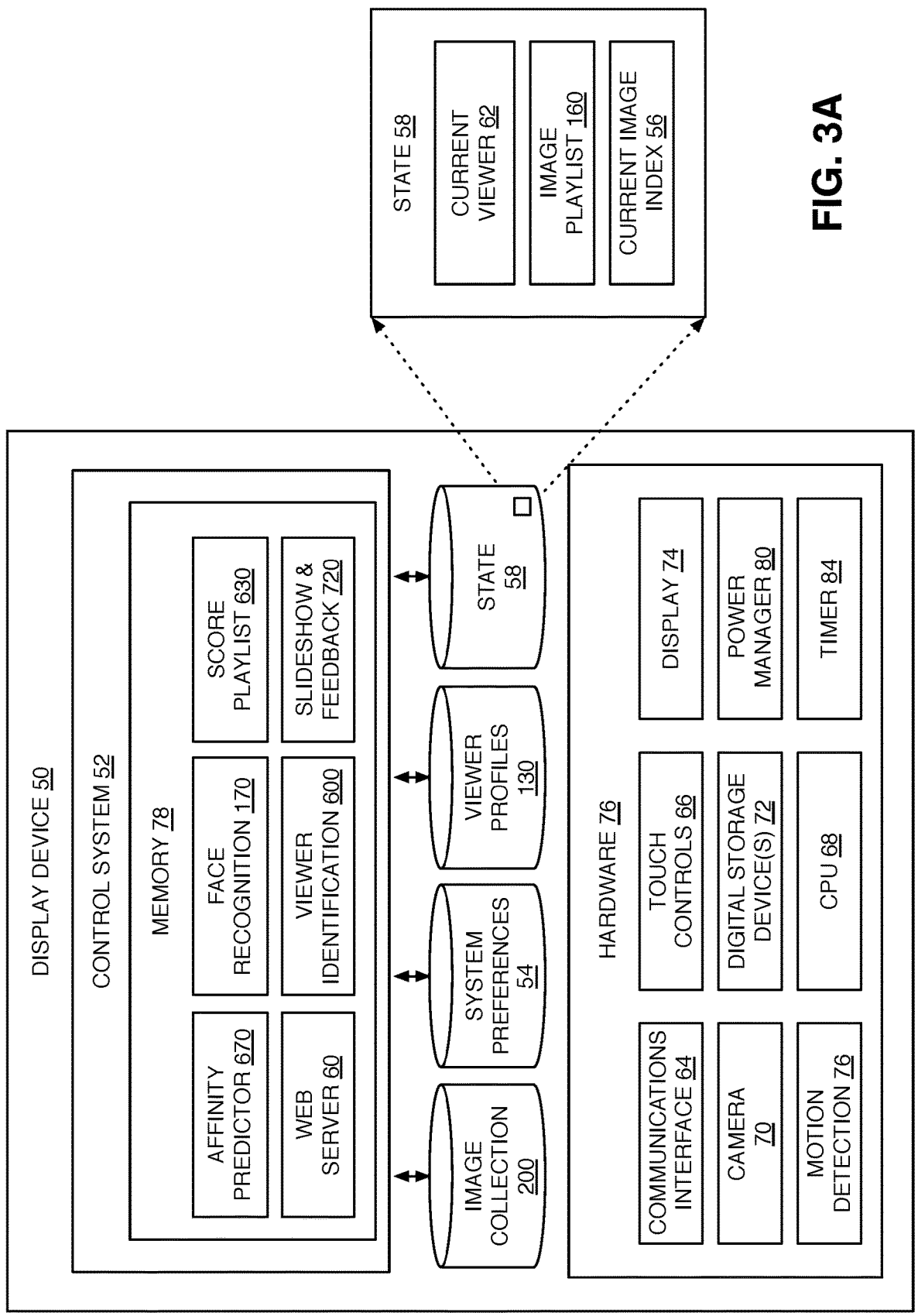
FIG. 3A is a block diagram showing the hardware and software components of an exemplary display device.

FIG. 3A is a block diagram showing the hardware 76 and control system 52 components of an exemplary display device 50. At the hardware level 76, the display device 50 is equipped with a microprocessor 68 and instruction memory 78 that are used to execute programmatic instructions on the device 50. Images 220 are stored in the internal storage 72 and presented on the display 74. The communications interface 64 can be used to provide additional data, status, and control to the device 50. A user can control the device 50 via touch controls 66 available on the device 50. Power consumption is minimized on the device via the power management subsystem 80. The power management subsystem 80 is responsible for putting certain functions of the display device 50 into sleep mode, while no motion is being detected 76. When motion is detected 76, the device 50 is woken, and the camera subsystem 70 takes an image 220 of the one or more viewers 001 in front of the display device 50. This information is then stored in memory 78.

At the control system level 52, system-wide preferences 54 and individual profiles 130 are stored on the display device 50 in the non-volatile storage 72. Faces within images 220 are detected via face detection software 172. Face matching software 176 is then used to compare the faces of one or more viewers 001 against subject faces contained in the images 001 . . . 008 that are accessible to the display device 50 as illustrated in FIG. 2. The image index generator FIG. 12A is responsible for producing the image collection info data structure 240 as illustrated in FIG. 4C. The program instructions for the image indexer 206 may be executed on each device that wishes to make its image collection 240 available to other display devices 50. Slideshow software 720 is used to display selected content from the image playlist 160.

In another embodiment of the disclosure, a web server 60 is used to facilitate remote management and control of the display device 50 over the network 20.

In another embodiment of the disclosure, the display device 50 is able to recognize the presence of multiple viewers 001[1-N] in front of the device. In this embodiment, identification information is stored for multiple current viewers 62, and the profile 130 information that is used to customize the selected content for display 160 is derived from the aggregated profile information 130 for all of the viewers 001[1-N] present.

Figure 3C:
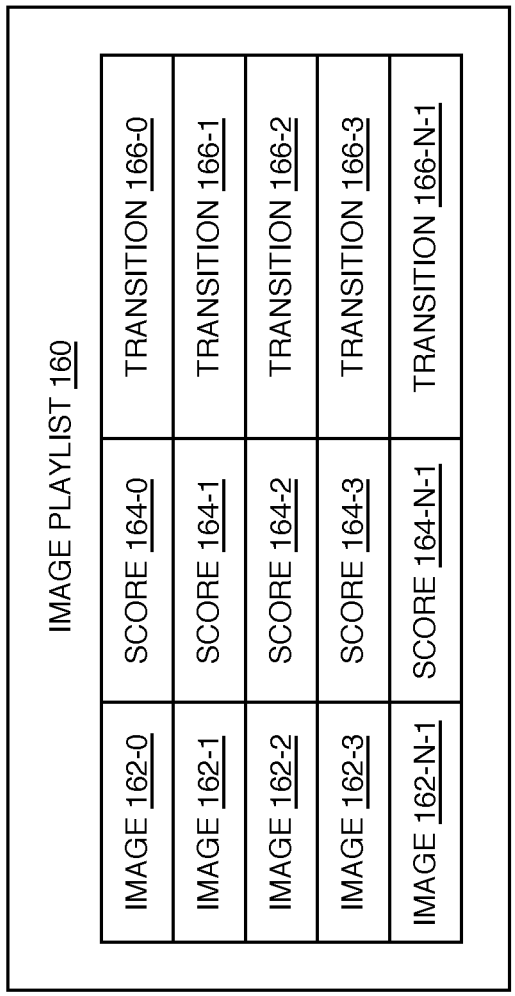
FIG. 3C is a block diagram of an exemplary embodiment of the data structure used to represent the image playlist as found in FIG. 3A.
Figure 3D:
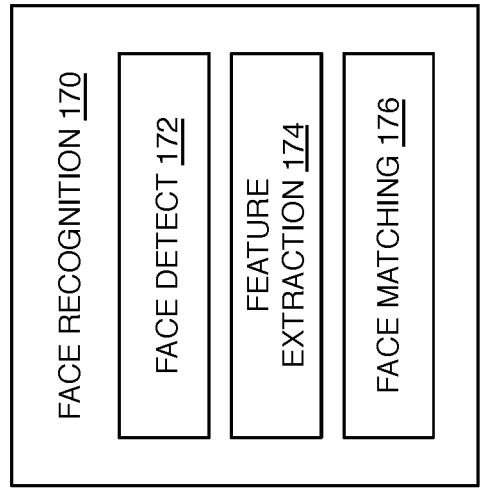
FIG. 3D is a block diagram of an exemplary embodiment of the software used to perform facial recognition as found in FIGS. 2, 3A, 4A, 7, and 8.
Figure 3B:
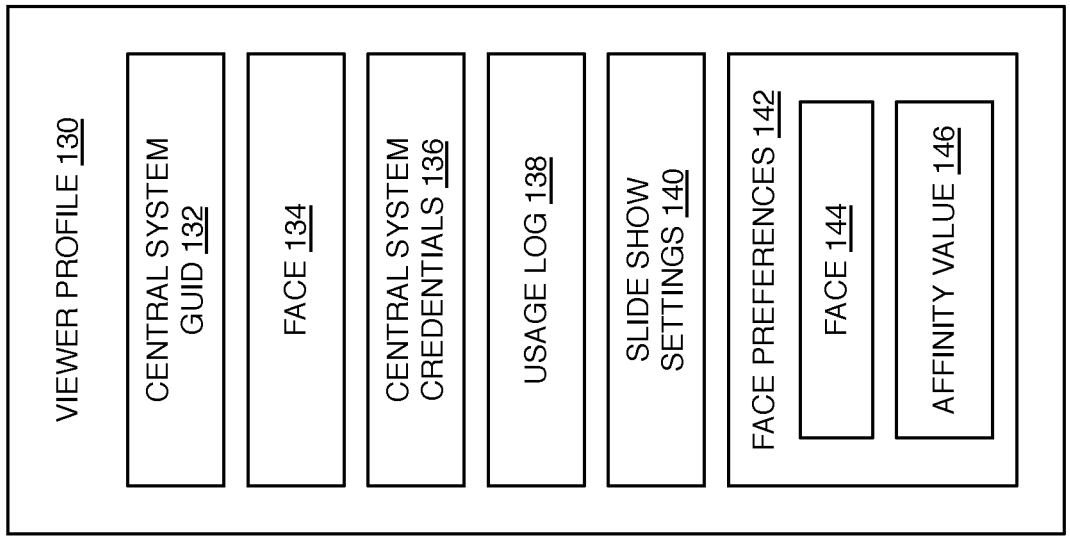
FIG. 3B is a block diagram of an exemplary embodiment of the data structure used to represent an individual viewer profile as found in FIG. 3A.

FIG. 3B is a block diagram of an exemplary embodiment of the data structure used to represent an individual viewer profile 130 as found in FIG. 3A. The user may be a viewer 001, or a person that is standing in front of the display device 50 and viewing images. The user may also be a subject, or a person who is in one or more of the images 220 accessible from the display device 50. Note that a user may be both a viewer 001 and a subject, that is, they are viewing the display device 50, but there are also images 220 accessible from the display device 50 in which that same viewer's face is present. The GUID 132 is a global identifier that is unique to this specific user within the system. The face image 134 is a reference to an image 220 of the face of the viewer 001 represented by this individual profile 130. The central system credentials 136 contain information uniquely identifying the subject as a user 012 of the central system 100. This information is normally comprised of a username and in some cases a password. The usage log 138 records activity by the subject, such as when a subject has acted as a viewer. The slide show preferences 140 store the users viewing preferences, such as the amount of time each image is shown, and the transition effect that is applied when transitioning from the current image to the next image. The face preferences 142 are used to record and maintain the viewers affinity 146 for other subjects 144. The face field 144 holds the GUID of a subject. In one embodiment, the affinity value 146 is a numerical value between zero and one representing the viewer's affinity for the referenced subject.

FIG. 3C is a block diagram of an exemplary embodiment of the data structure used to represent the image playlist 160 as found in FIG. 3A. The image playlist 160 is used to hold a reference 162 and score 164 for each image scheduled for presentation on the display device 50. The scores 164 are calculated according to the flowchart presented in FIG. 10C. The transition type 166 indicates the transition algorithm to be used when switching from the current image to the next image.

FIG. 3D is a block diagram of an exemplary embodiment of the software used to perform facial recognition 170 as found in FIGS. 2, 3A, 4A, 7, and 8. Face detection 172 is used to resolve the location of a potential face within a given image. Feature extraction 174 is then used to identify the geometric features of the face, such as the eyes, nose, mouth, and the like. Face matching 176 is used to compare the extracted features 174 from two faces to determine the probability that the faces match, or more explicitly, refer to the same person or subject. If the match probability falls above a user selectable threshold, then the two faces are assumed to be a match.

FIG. 4A is a block diagram of an exemplary embodiment of the image collection subsystem 200 used in items 50, 30, and 100 of FIG. 2 responsible for indexing imaging content and providing the indexed data 240 over a network 20 to a display device 50. The image collection 200 encapsulates the code and data representing a collection of images 220. The image store 204 represents the file system containing the local images 220. The image indexer 206, explained in additional detail in FIG. 12, contains the program codes for detecting the faces in each image 220, and building the image collection index 240. The image collection index 240, explained in additional detail in FIG. 4C, is used to provide convenient programmatic access to the image collection 200. The image collection 200 is indexed both by face 250 and by image 260. The purpose of this data structure 240 is to provide efficient programmatic access to representative images of all faces found within a collection 200, all images in which a particular face is found 250, and all faces within a particular image 260. This efficient access is important when image collections 200 are accessed over the network 20 and network throughput and latency can degrade performance.

FIG. 4B is a block diagram of an exemplary embodiment of the data structure used to represent an image 220. The image 220 contains image data 222 representing the pixels of the image. The image data may be in either compressed or uncompressed form. The metadata 224 contains additional information about the image 220. The timestamp 226 fields contain the data, time, and time zone in which the image 220 was captured. The location stamp 228 holds the GPS location coordinates at which the image was captured. The keyword tags 230 field contains a plurality of textual tags descriptive of the image 220. Face tags 232 contain information identifying subject faces contained in the image 220, and their corresponding locations. The face tags 232 also include identity information corresponding to the subjects represented by the faces. The identity information may be in the form of the subjects name, a GUID 132, or username 136 corresponding to an account on the central system 100.

FIG. 4C is a block diagram of an exemplary embodiment of the data structure used to represent a digital image collection index 240 as used in FIG. 4A. Subject to subject affinity information 242 is used to store affinity predictions between any two subjects contained within a given image collection 200. In one embodiment of the present disclosure, the information is stored according to the structure shown in FIG. 5A. Subject to image affinity information 244 is used to store affinity predictions between any subjects contained within at least one image 220 of the image collection 200. In one embodiment of the present disclosure, the information is stored according to the structure shown in FIG. 5B. Note that subjects may also include a viewer 001 who is not contained in any image 220 of the collection 200. Also note that not all images 220 are required to contain faces.

The zone definitions 246 field contains information regarding the set of non-overlapping areas into which images are divided as further exemplified in FIG. 20A.

The subject face index 250 contains one entry per unique face found in an image collection 200. For each face 252, the list of images 254 in which the face is contained is recorded 270 along with the weighting zone 272, the size ratio 274 of the face in relation to the entire image, the center point of the face 276, and the radius of the circle containing the face 278. This structure is advantageous because given a face reference; it is easy to quickly determine the list of all images 220 in which the face is contained.

The image index 260 contains one entry for each image stored in a collection FIG. 7. For each image 262, a list of the faces 264 occurring in the image is recorded. Information regarding the zone 272, size ratio 274, center point 276, and radius 278 are also recorded. The ID 279 is a unique identifier of the subject. In one embodiment of the present disclosure, the GUIDs are assigned at the central system 100 when a subject face is matched to a user 012 of the central system 100. This structure is advantageous because given an image reference; it is expedient to quickly determine the list of all faces contained in the image.

FIG. 4D graphically illustrates an exemplary image collection 200 indexed by both subject 296 and image 298. The subject index 250 corresponds to 296. The image index 260 corresponds to 298. As shown by the links in this illustration, each subject representation 280 282 284 286 contains a link to each image in which that face is found, and each image representation 288 290 292 294 contains a link to all subjects found within that image. For example, face 001 contains links to images 288 and 290. Likewise, image 290 contains links to the reference face image 280 for subject 001 and face image 282 for subject 002.

FIG. 5A is a block diagram of an exemplary embodiment of the data structure used to represent affinity information between subjects (subject affinity). Subject affinity is an indication of the strength of the relationship and desirability of one subject for another. In one embodiment of the present disclosure, the numerical ranges of the values fall between zero and one, where zero indicates no affinity, and one represents maximum affinity. Note that affinity between two users need not be symmetric. In other words, the affinity for subject six by subject three 302 need not be the same as the affinity for subject three by subject six 304. This is referred to as non-symmetric affinity, and can occur between a fan and celebrity for example.

There are a number of approaches to determining subject-to-subject affinity. In one embodiment, subject faces are matched to users 012 of a central system 100, such as a social networking site, and the social distance between the users 012 is employed to estimate affinity. This assumes that user pairs with shorter social distances have higher subject affinity than subject pairs with a higher social distance.

In another embodiment of the present disclosure, subject affinity is estimated by using subject faces co-occurrence within images 220. This assumes that subjects with a high co-occurrence rate within images 220 will have more affinity for one another than subject pairs with a low co-occurrence within an image collection 200.

In another embodiment of the present disclosure, subject affinity is determined by prompting the viewer 001 of the display device 50 with a dialog showing the highest occurring subject faces within the image collection 200. An example of such a dialog is shown in FIG. 19. When a new viewer 001 is detected in front of the display device 50, the viewer 001 is prompted to specify subject affinity preferences using touch screen controls. The viewer 001 assigns a high score to the subject faces they would like to see, and a lower score to faces they do not care to see.

In yet another embodiment of the present disclosure, the display device 50 simply attempts to match the face of the viewer 001 to faces found in the images 220. Images in which the viewer's face 001 is found score higher. Note that this approach is not detailed further in this document due to it's simplicity, but is in fact a special case of the general case where the subject affinity matrix has only one row and one column.

Note that none of the approaches are likely to be right in all cases, particularly when social distance data and co-occurrence data are sparse. These approaches are intended to yield an intelligent starting point, from which the system can adapt and improve its accuracy predicting viewer to subject affinity through viewer 001 response.

FIG. 5B is a block diagram of an exemplary embodiment of the data structure used to represent affinity information between subjects and images (image affinity). In this case, image affinity is an indication of the desirability of a subject for an image 220. In one embodiment of the present disclosure, the numerical ranges of the values fall between zero and one, where zero indicates no affinity, and one represents maximum affinity.

FIG. 6 illustrates the operation of the system of FIGS. 1, 2, and 3 according to one embodiment of the present disclosure. The display device 50 owner (administrator) enters configuration and initialization information 402. In one embodiment, the administrator enters this information via a browser 34 communicating with a web server 60 running on the display device 50. A collection sharing device 30 makes it's image collection available over the network 20.

Next, a viewer 001 of the display device 50 inserts removable media storage 72 into the display device 406. The display device 50 then indexes the images 220 on the removable media 408, and stores the results in an image collection index 240. Next, the display device 50 detects motion in front of the display device 50 and captures the face 410 of the viewer 001. These steps are also shown in FIG. 10B.

An image collection index 240 is then sent to the central system 412. From this image collection index 240, the central system 100 attempts to match faces found in the image collection index 240 to users of the central system 414, and to determine the social distance between those users 012 that are identified 416. The social distance information is then converted to subject-to-subject affinity information, and returned to the display device 418.

Since central systems 100 are potentially quite large, viewer identity 136 information and display device 50 owner information is sent to the central system 100 when attempting to match faces from the image collection index 240 to central system 100 users 012. This identity information 136 gives the central system 100 additional hints that can be used when attempting to match faces. For example, central system 100 users 012 that are closer in social distance to the current display device 50 viewer 001 or the display device 50 owner are more likely to appear in images on that owners display device 50 than someone simply picked out of the general population of central system 100 users 012.

Subsequently, the display device 50 using the social connection matrix FIG. 15B converts the information into a social distance matrix 15C that contains the social distance between any two subjects found in the matrix. Next, the subject-to-subject affinity matrix is used to produce the viewer to image affinity matrix of 15E 420. An image playlist 160 is then assembled from the viewer to image affinity matrix 15E by matching the current viewer to the matching viewer in the matrix, and applying whatever sorting preference and transition that viewer has specified 422.

Based on a periodic timing interval, images 220 are then shown 424 one at a time according to FIG. 10G. The facial responses of the viewer are subsequently monitored 426, and the viewers profile is adjusted 428. This process is then repeated 432 until such time that a new viewer 001 is identified 430.

FIG. 7 is a block diagram of the display device 50 of FIG. 2 according to one embodiment of the present disclosure. In general, the display device 50 includes a control system 52 having associated memory 78.

In this embodiment, the affinity predictor 670, face recognition 170, playlist scoring 630, web server 60, viewer identification 600, and slideshow and feedback modules 720 are implemented in software and stored in memory 78. However, the present disclosure is not limited thereto. The affinity predictor 670, face recognition 170, playlist scoring 630, web server 60, viewer identification 600, and slideshow and feedback modules 720 may be implemented in software, hardware, or any combination thereof.

The display device 50 may also include one or more digital storage devices 72 such as, for example, one or more hard disk drives. The one or more digital storage devices 72 may be used to store images 220. The display device 50 also includes a communication interface 64 communicatively coupling the display device 50 to the network 20. Lastly, the display device 50 may include a user interface 51, which may include components such as a display, one or more user input devices, or the like.

FIG. 8 is a block diagram of the central system 100 of FIG. 2 according to one embodiment of the present disclosure. In general, the central system 100 includes a control system 102 having associated memory 104.

In this embodiment, the face matching 170, affinity predictor 750, and account management 105 are implemented in software and stored in the memory 104. However, the present disclosure is not limited thereto. The face matching 263, affinity predictor 750, and account management 105 may be implemented in software, hardware, or a combination thereof.

The central system 100 may also include one or more digital storage devices 122 such as, for example, one or more hard disk drives. The one or more digital storage devices 122 may be used to store images. The central system 100 also includes a communication interface 124 communicatively coupling the central system 100 to the network 20 (FIG. 2). Lastly, the central system 100 may include a user interface 101, which may include components such as a display, one or more user input devices, or the like.

FIG. 9 is a block diagram of the collection sharing device 30 of FIG. 2 according to one embodiment of the present disclosure. In general, the collection sharing device 30 includes a control system 32 having associated memory 34.

In this embodiment, the request handler 202, collection indexer 206, and collection index 240 are implemented in software and stored in the memory 34. However, the present disclosure is not limited thereto. The request handler 202, collection indexer 206, and collection index 240 may be implemented in software, hardware, or a combination thereof.

The collection sharing device 30 may also include one or more digital storage devices 36 such as, for example, one or more hard disk drives. The one or more digital storage devices 36 may be used to store images 220. The collection sharing device 30 also includes a communication interface 38 communicatively coupling the collection sharing device 30 to the network 20 (FIG. 2). Lastly, the collection sharing device 30 may include a user interface 31, which may include components such as a display, one or more user input devices, or the like.

FIG. 10A is a flow chart illustrating a process for processing events originating from both the user and display device in one embodiment of the present disclosure. The display device 50 employs an event driven architecture, where events can come from both hardware sources and viewer 001 interactions with the device 50. Hardware sources may include interrupts originating from timers 84, communications interface 64 504, image sensors 70, motion detectors 76 500, display refresh requests 74, file system requests 72, power management functions 80, and the like. User interaction sources include activities such as inserting a removable memory drive 502, a viewer 001 touching the display of the touchscreen 506, and pressing buttons found on the physical enclosure of the display device 50.

Events are placed in an event queue 508, and pulled from the event queue by an event dispatcher 510 that in turn invokes the appropriate event handler 512, 514, 516, 518.

Motion events are 500 are triggered by a viewer 001 walking in front of the display device 50. The motion detector 76 causes the display device 50 to "wake up", going from a low power consumption state, to a higher power consumption state. The viewer identification event handler 600 handles the motion event 500, by taking an image with the camera 70 on the front of the display device 50, and resolving the face of the viewer 001.

Inserting removable media will trigger a disk event interrupt 502, which will deposit an event into the event queue 508. The event is in turn handled by the image indexing event handler 630, which resolves and indexes all of the faces in each of the images 220 on the removable media. Likewise, a collection of images 200 becoming available over the network 20 will trigger a similar event 504, which is also handled by the image index generator 775.

The slideshow event handler 516 is triggered by a user configurable timer 84, and causes viewer feedback to be collected, and the next available image to be displayed. The touch screen interrupt 506 is triggered whenever a viewer 001 touches the display device 50 display 74. The UI handler 518 is invoked to process the event posted in response to the touch screen interrupt 506.

FIG. 10E3 is a flow chart illustrating a process identifying a viewer 001 of the display device 50 according to one embodiment of the present disclosure. The program steps of FIG. 10E3 are executed in an event handler 600 that is triggered in response to a viewer 001 being detected in front of the display device 50. The event handler first checks to verify that an image collection 200 is available for display 602. If no image collection is available 622, the event handler waits 620 before responding to another viewer 001 detection 600. The camera 70 on the display device 50 is triggered via the motion detection circuit 76. An image 220 of sufficient quality is then captured 604, and the faces contained in the image 220 are resolved 606. If a no new viewer 001 is detected in the image 608, then the event handler waits 620 before responding to another viewer detection 600. Otherwise the event handler proceeds to determine if this viewer 001 is already a known user in the system 610. A known user is either a subject whose face appears in at least one image in the available image collection 200, or a viewer 001 who has used the display device 50 before, or both.

Once a new viewer has been detected, the display device 50 then attempts to determine other faces that may be of interest to the viewer 612. In one embodiment of the present disclosure, this step 612 can be as simple as identifying the images in which viewer's 001 face is contained. Once the affinity information has been obtained 612, a new user profile record 130 is created and the affinity information is stored 614. The newly detected viewer is then made the current viewer 616.

In step 618 the available images from the one or more image collections 200 are scored based on the subject affinity between the current user, and the subject faces found in the respective images. The results of this scoring are stored in the image playlist 160. The data structure contains a list of images 162, and their associated scores 164.

FIG. 10C is a flow chart illustrating a process for using affinity information to score an image playlist 160 for a viewer 001 according to one embodiment of the present disclosure. The module starts by retrieving the current viewer profile 630 and operates by cycling through each image contained in the current image playlist 160 one image at a time 631. The module processes each image by first resolving all of the faces contained in the image 632, and then scoring each face 638 according to FIG. 10D. Once all faces have been accounted for 640, a final score for the image 220 is stored in the current image playlist 642. This process is repeated until all images in the current image playlist 58 160 have been processed 646.

FIG. 10D is a flow chart illustrating a process for scoring a single subject face when encountered during the process of scoring an image 220 as found in FIG. 10C. This module takes as its inputs a subject affinity matrix, and the current viewer information 58 160. If the subject face being scored is not in the subject affinity matrix 650, then a default value is assigned 662. Otherwise the viewer to subject affinity is retrieved from the subject affinity matrix 652. The size of the subject face being scored is then calculated 654, and used to modify the subject affinity according to FIG. 19. Next, the zone in which the subject face occurs is determined 655, and used to modify the subject affinity according to FIG. 18. Finally, the scored is calculated as a function of these three factors 656 and returned 658. Note that this is an exemplary scoring calculation. One of ordinary skill in the art would recognize that many other variations are possible.

FIG. 10E is a flow chart illustrating a process for building the subject affinity matrix that is used to represent the strength of relationship between any two users of the system according to one embodiment of the present disclosure. The module takes as its input a subject face index 296 that contains one unique entry for each subject face occurring in the entire image collection 670. If specified by preference, the viewer is prompted 672 with a dialog showing the N highest occurring faces in the collection, and given the opportunity to explicitly specify their affinity for those subjects. N is a function of how many faces may be reasonably represented on the display of the display device 50 at a one time. An example of this dialog is shown in FIG. 17. When the image collection 200 is small or the display size is large, it may be possible to show all faces in the collection on the display at once.

If a WAN network connection is available 676, the display device 50 may then further refine the subject affinity matrix by transmitting a image collection index 240 to a central system 678 and using the returned subject affinity matrix to replace the missing subject affinity values. Finally, subject face co-occurrence within single images may be used to predict subject affinity 680. Affinity may then be modified based on the proximity of other faces occurring within the images 681 according to FIG. 20. Note that this is an exemplary scoring calculation. One of ordinary skill in the art would recognize that many other variations are possible.

FIG. 10F is a flow chart illustrating a process for incorporating a newly available image collection 200 with a possibly existing image collection 200 according to one embodiment of the present disclosure. The new image collection available event 514 is invoked when a new image collection 200 becomes available. The image collection 200 may be newly available because the display device 50 has recently booted, and the device is initializing and loading the locally stored images 204. The image collection 200 may also be newly available because a viewer 001 has inserted a removable media 72 into the display device 50, or because another compatible electronic device 30 has joined the network 20 to which the display device 50 is attached, and is sharing an image collection 200 over the network 20. The event handler 514 starts 700 by determining if the image collection 200 is accompanied by an existing image collection index 240. If not 701, then a new image collection index 240 is created representing the collection 702. Once the image collection index 240 is available, any new faces from the new collection index 240 are merged with the existing faces to form an updated face index 706 FIG. 10F. The updated subject face index is then used to produce an updated subject affinity matrix 708. Finally, the image playlist 160 is updated 710 from a subject affinity matrix.

FIG. 10G is a flow chart illustrating a process for displaying a slideshow on the display device 50 according to one embodiment of the present disclosure. The slideshow and feedback event handler 516 FIG. 10G takes as its input the current viewer profile 62, the current image playlist 160, and the current image index 56. This information is retrieved in the first step 720. It then retrieves preference information for the current viewer such as transition type, transition speed, and display time 721. Examples of transition types include wipe, dissolve, twirl, and the like.

Next, the response of the viewer 001 is measured 724, and the response information is used to adjust and refine 726 the current viewer 62 stored profile 728. For subject faces that the viewer 001 responds positively to, their preference 142 for that subject face will be increased 146. Likewise, for subject faces that the viewer 001 responds negatively to, their preference 142 for those subject faces are decreased 146. Viewer 001 evidence of a positive response may come in the form of a smile, prolonged attention, or focus. Evidence of a negative reaction may take the form of a frown, reduced attention span, or reduced focus. Other indicators are also possible.

Finally, the current image index 730 is incremented. If the end of the image playlist 160 is encountered 732, then the current image index is reset 734, and display continues from the top of the image playlist 160 736.

FIGS. 11A-B are flowcharts illustrating a process performed by the central system 100 to match subjects 768 to users 774 of a central system 100. The central system 100 receives a request 750 over the network 20 comprised of a list of subject identifiers 768. The request is then divided into two sets. The first list is the set of unknown subjects 751 770. Unknown subjects 770 are represented by subject identifiers 767 that include an image 220 of the face of the subject, but do not contain information uniquely identifying the subject to the central system 100, such as username, GUID (Globally Unique Identifier), or the like. The second list is the set of known subjects 752. Known subjects 769 are represented by subject identifiers 767 that contain identity information that allows the central system 100 to match the subjects to a user 012 of the central system 100 based on identity information, and without using face matching 176. In both the case of known subjects 769, and unknown subjects 770, the subject identifiers 767 may contain auxiliary information about the subject such as demographic information, preference information, calendar information location history, communications history, and the like.

Next, the process proceeds by retrieving the face corresponding to the next unknown subject identifier 753. The face from the unknown subject identifier is then matched to a user 012 of the central system 100 using facial matching techniques to match the unknown face with faces stored in user accounts 106 754. A list of the N closest potential matches 773 is formed 755 and refined using any available auxiliary information available in the subject identifier. The face matching 176 occurs between the face image found in the subject identifier, and one or more face images representing a central system user 012. The face images for the central system user 012 may come from the users profile picture, images hosted on the central system 100 where the user 012 has been tagged, or any combination thereof.

The potentially matching central system users 756 760 are then compared 757 758 759 771 to each known subject 769 based on the social distance between the potential match 773 and the known subject 769. Based on this comparison, the match score may be refined 758.

In one embodiment of the present disclosure, the image collection index 240 is used as the input to the process of FIGS. 11A-B, and the subject identifiers are extracted from the subject references 250 of the index 240.

The rationale behind these operations is that if a potential match 773 is close in social distance to a known subject 769, the match is more likely to be correct. This refinement process repeats until all known subjects 759 769 are compared to the set of potentially matching central system users 760 773. The potential matches 773 are then re-ranked, and the highest potential match score is compared against a match threshold 761. If the match score of the potential match 773 exceeds or matches a match threshold, then the unknown subject 770 is considered matched to the corresponding user 012 of the central system 100. This process is continued until there are no more unknown subjects 764. The social distance is then used to estimate the subject affinity for all known and identified subjects 765. The response information is provided to the requesting display device 766. The response information may be in the form of a subject-to-subject affinity matrix, augmented subject identifiers, augmented collection index, any combination of the above, and the like.

FIG. 11C depicts an exemplary subject to central system user 012 matching process of FIGS. 11A-B. The group of subject identifiers 768 passed to the central system for identification is composed of multiple individual subject identifiers 767. The group of subject identifiers 768 is then split into a group of known 769, and a group of unknown subjects 770. In one embodiment of the disclosure, the group 774 of central system users 012 is composed of all of the individual users 791 of the central system 200. When attempting to identify a single unknown subject 792 from the group of unknown subjects 770, facial recognition and auxiliary information is used to identify a group of possible matches 773. Comparing social distance 771 between each potential match 773 and each known subject 769 then refines the match score for each potential match 773, the match score being refined upwards based on a relatively shorter social distance when compared to other potential matches 773.

As a final step, once each unknown subject 770 has been matched to a central system user 012, the match score of the potential match 773 may be further refined by determining 772 the average social distance of the potential match 773 to each of the unknown subjects 770, and refining the match score higher based on a relatively shorter social distance when compared to the other potential matches 773.

FIGS. 12A-B are flowcharts illustrating a process performed by an exemplary embodiment of the image collection index generator. The process begins when the image index generator receives a request 775. The request may contain parameters indicating the desired format and the content of the response. Next, the generator checks to see if an index 240 of the collection 200 already exists 776. If so, a response is formatted 789, and returned 790. Otherwise a collection index 240 needs to be computed. For each successive image 777, a reference is added to an image index 778. Next, facial recognition is employed in determining a set of zero or more faces found in the image 779. Each face is successively examined 780. If the face has not been encountered before 781, a reference for the face is added to the face index 782. Next, 783, a reference for the faces is added to the image. The image index generator operates as part of the display device 50, the collection sharing device 30, and the central system 100. It is available both programmatically from a local device, and over the network 20 from other devices.

The process is completed when all faces 787 have been examined in all images in the collection 200. The collection index 240 is saved 788 for future use, the response is formatted according to the optional request parameters 789, and an image collection index 240 is returned 790.

FIG. 13 illustrates an alternate embodiment of the system found in FIG. 2, wherein the display device 50 has been simplified with the face recognition 170, affinity prediction 670, and image hosting 200 taking place at the central system 100. In this embodiment, the display device 50, has been simplified to perform obtaining reference person information, presenting the slideshow, and collecting feedback from the reference person, or viewer 001. An embedded HTTP browser 53 is employed to present the slideshow FIG. 10G.

In accordance with this simplified display device 50 embodiment, the central system 100 takes on additional complexity. Based on reference person information provided by the display device 50, viewer identification is performed 600. Face recognition 170 is used to aid in affinity prediction 600. Based on affinity prediction 104, an image playlist is built 630, taking into account viewer preferences and profiles 130. Account management software 105 operates to store and retrieve relationship information stored in the user accounts 106.

The embodiment of FIG. 13 has the advantage that the display device 50 is simplified, and can be made more cheaply due to reduced computing complexity and storage requirements. Computing requirements are reduced because software for facial recognition 170 and affinity prediction 104 is executed on the central system 100. Storage requirements are reduced since images 220 are stored on the central system 100 and not on the display device 50.

In another embodiment of the present disclosure, the presentation of images occurs in a browser on a computing device, and there is no separate display device 50. In this embodiment, the images are stored at the central system 100, and the viewer is assumed to be the user 012 who is logged into the central system 100 through the browser.

It should be noted that this embodiment, while producing a cheaper display device 50, suffers from the requirement that the display device 50 needs either a communications interface 64 or removable memory to be able to display images, since images may not be available locally 72.

FIG. 14A graphically illustrates an exemplary collection 200 of digital images 220 comprised of subject faces. The collection contains eight images (800, 802, 804, 806, 808. 810, 812, 814) that are comprised of varying combinations of the eight subject faces 001-008. The number of subject faces happens to match the number of images, but that need not be the case. Also, the subject faces, when present, always appear in the same position in the images. Again, this is for the illustration purposes only, and need not be the case.

FIG. 14B is a table illustrating which subject faces is contained in which of the exemplary images. When an image contains a subject face, the corresponding matrix cell is marked with a "1". Likewise, when an image does not contain a subject face, the corresponding matrix cell is marked with a "0". For example image one contains the faces of subjects one, two, and three.

Note that in FIG. 14B and all subsequent figures, the images numbered (800, 802, 804, 806, 808. 810, 812, 814) have been renumbered IMAGE 1-IMAGE 8 for simplicity.

FIG. 15A is a graphical illustration of an exemplary central system 100 where users 012 form connections to other users 012 to facilitate the control of the sharing of information. The social distance between two users is the minimum number of hops required to get from a first user to a second user. A direct friend would have a social distance of one. A friend of a friend would have a social distance of two, and so on.

FIGS. 15B-F are exemplary calculations showing how each image is assigned a composite score for each viewer 001 using social distance 818 data obtained from the exemplary central system 100 shown in FIG. 15A. FIG. 15B shows in tabular form the connections of the central system 100 shown in FIG. 15A. The theory of scoring images using social distance is based on the assertion that a viewer 001 is more likely to want to see a image 220 containing someone they know, than someone less known to them.

FIG. 15C shows the social distance between any two users in our example central system 100 of FIG. 15A. All hops are assigned a weight of 1. Note that additional qualifiers may be used to refine the described social distance weighting model. For example, the popular social networking site Facebook offers nine potential qualifier when classifying contacts: "Lived Together", "Worked Together", "Went to School Together", "Traveled Together", "From An Organization", "Team Or Group", "In My Family", "Through A Friend", "We dated", "Other". Depending on a viewers profile 130, they could have a strong preference for viewing family members, thus that relationship would be assigned a relatively shorter social distance, thus resulting in a higher affinity prediction.

FIG. 15D shows the computation of a social distance-weighting matrix. The matrix element is calculated according to the formula:

$$W_{rc} = \sum_{i=1}^{N} 1/(1+d)^2 \qquad \text{Equation (1)}$$

where r denotes row, c denotes column, and d is the social distance from matrix 15C.

FIG. 15E shows the computation of the affinity matrix. This matrix is computed according to the formula:

$$[P]_{rc} = [S]_r [W]_c \qquad \text{Equation (2)}$$

where r denotes row, c denotes column, S is the face occurrence matrix of FIG. 15B, and W is the social distance weighting matrix of FIG. 15D. Multiplying matrix S[8×8] by matrix W[8×8] yields matrix P [8×8] which contains the score of each image for each viewer. The following computations show the calculation of the $P_{11}$:

$$P_{11}=1\times1/(1+0)^2+1\times1/(1+1)^2+1\times1/(1+2)^2$$

$$P_{11}=1+1/4+1/9$$

$$P_{11}=36/36+9/36+4/36$$

$$P_{11}=49/36$$

$$P_{11}=1.361$$

Note that in FIG. 15E, higher values represent a higher affinity between two subjects, while a lower value represents the opposite.

FIG. 15F represents the normalized version of 15E. The maximum value in the matrix P is 1.50. To normalize the matrix, and scale all values in the matrix to fall in the range of zero to one, we divide all values in the matrix by 1.5.

It follows from 15F that for our viewer 001 (subject 1 in FIG. 15F), the top scoring images are images one and seven. The lowest scoring image is number four. Other schemes for computing subject affinity based on social distance will be apparent to one of ordinary skill in the art upon reading this disclosure and are to be considered within the scope of the present disclosure.

FIGS. 16A-D are exemplary calculations showing how each image is assigned a composite score for each possible viewer 001 using subject face 001-008 co-occurrence within the image data obtained from the exemplary image collection of FIG. 14A. The idea being that if two subjects are in multiple images together, then they might know each other at some level, and that a viewer 001 is more likely to want to see a image containing someone they know, than someone less known to them. It is also possible to use multiple levels of co-occurrence information. For example, if subject A appears frequently with subject B in an image collection, and subject B occurs frequently with subject C, on average, we may predict that subject A has an above average affinity for subject C. In plain language, we may predict that if subject A can't see images containing a friend (subject B), they would rather see a friend of a friend (subject C) than a stranger. For the sake of simplicity, only first order co-occurrence information is used in the example represented by FIG. 16. Other schemes for computing subject affinity based on image co-occurrence will be apparent to one of ordinary skill in the art upon reading this disclosure and are to be considered within the scope of the present disclosure.

FIG. 16A shows the co-occurrence count of subjects in the images shown in FIG. 14A. For example, subject one appears with subject two in two images, while they appear with subject seven zero times. In theory, this would indicate a closer relationship between subjects one and two. In reality, this is more likely to be true when a large number of images are available to analyze.

FIG. 16B shows a normalized version of FIG. 16A, where dividing by the maximum value of four has normalized the matrix. FIG. 16C is calculated by multiplying the matrix S from FIG. 15B by matrix W of FIG. 16B to produce the matrix P, which is a prediction of the affinity by the various subjects to the images of FIG. 14A. FIG. 16D is calculated by normalizing FIG. 16C by the maximum value of two. It follows from the FIG. 16D, that for our subject 001, the top scoring images is one, and the lowest scoring image is number four.

FIG. 17 is an exemplary graphical user interface for collecting subject affinity information from a viewer 001 of a display device 50. In this embodiment the viewer to subject affinity may be determined by directly querying the viewer 001. In FIG. 17, the viewer 001 is prompted to enter in values 822 indicating their preference for each subjects face contained in the image collections 200 available to the display device 50. In this embodiment, these values 822 would be entered by pressing controls 820 824 on a touch display. Once the viewer 001 has expressed all preferences, pressing the "OK" button 826 to confirm the selections completes the operation. If the viewer wishes to skip setting these preferences, they may cancel out of the operation 828.

FIG. 18A graphically illustrates an exemplary digital image divided into zones, such that different weights may be assigned to different zones, for the purpose of modifying the image affinity scores for faces found in different zones. Using this embodiment, images occurring in the center zone(s) 830 are given a higher weighting than faces occurring towards the edge of the image 832. It follows that given two images containing the same face, the assertion is that a viewer 001 would like the image where the subject is in the middle area of the image, since the image is more likely to be focused on the subject. To help determine that information, the image is split into two or more zones 830 832, and each zone is assigned it's own weight. In our two zone example in FIG. 18A, the zone in the center 830 would be assigned a higher weight than the zone around the edges 832. To determine which zone a face falls in, a circle 836 inclosing the face is determined, and the center of that circle 838 is compared to the available zones to determine the zone in which it falls.

Taking the zone definition line 834, and excluding the area of any zones occurring within the zone definition line define zones. The outer most zone is defined as the area of the image, minus any zones occurring within the image FIG. 18B is a table illustrating exemplary zone weighting values for the exemplary digital image shown in FIG. 18A. Following from FIG. 18A, zone A 830 has been assigned a weighting multiplier of one while zone B 832 has been assigned a weighting multiplier of ½. In effect, a face occurring in zone A is given twice the weight as a face occurring in zone B. Accordingly, face 002 falls in zone A, and given a weight of one. In one embodiment of the present disclosure, this calculation is performed in step 655 of FIG. 10D. Other schemes for positioning zones and assigning weighting values will be apparent to one of ordinary skill in the art upon reading this disclosure and are to be considered within the scope of the present disclosure.

FIG. 19A graphically illustrates an exemplary digital image where the subject faces have been resolved and their respective areas determined, for the purpose of modifying the image affinity scores of faces based on their respective sizes. Given two or more faces in an image, the assertion is that the larger face 002 should influence the score of the image more so than the smaller face 003. FIG. 19A illustrates this scenario. The face size ratios for each of the faces occurring within the image 220 are measured by taking the area of the circles enclosing the faces 840 842 844 and dividing by the total area of the image respectively.

FIG. 19B is a table illustrating exemplary weighting values for the exemplary digital image shown in FIG. 19A. Following from FIG. 19A, FIG. 19B assigns specific multiplier weights for given face area intervals. By way of example, the circle 842 containing face 003 has the area $pi(d/2)^2$, while the area of the entire image is $24d^2$. Therefore the ratio of the face size to image area is $pi/96=0.0327$. Accordingly, a weighting multiplier of 0.0625 is used from FIG. 19B. In one embodiment of the present disclosure, this calculation is performed in step 654 of FIG. 10D. Other schemes for determining face size ratios and assigning weighting values will be apparent to one of ordinary skill in the art upon reading this disclosure and are to be considered within the scope of the present disclosure.

FIG. 20A graphically illustrates an exemplary digital image whereby the faces have been identified, and the distance between each face determined for the purpose of modifying the exemplary face co-occurrence scores of FIG. 16 based on the distance between each subject face pair. In this embodiment, given an image with three subjects, the assertion is that there is likely more affinity between the two subjects that appear closest in the image 856, and less affinity between the subjects that appear farthest apart in the image 858. Using this logic, it is possible to further adjust the values entered into the co-occurrence matrix shown in FIG. 16A. For example, instead of simply counting the number of co-occurrences, a higher weight would be assigned to subject pairs in close proximity, and a lower weight to subject pairs with less proximity.

FIG. 20B is a table illustrating exemplary weighting values for the exemplary digital image shown in FIG. 20A. Following from the image of FIG. 20A, FIG. 20B shows an exemplary table of weighting multipliers. Using the faces 001 and 002 from 20A as an example, it can be shown that the ratio of the distance between the centers 851 853 of the circles 850 852 containing the faces 001 and 002 divided by the diagonal distance of the image is $d*sqrt(2)/d*sqrt(50)$, or $sqrt(1/25)=1/5$. Since $1/5<0.3$, the affinity between the two subjects 001 and 002 is assigned a weighting of one. In one embodiment of the present disclosure, this calculation is performed in step 681 of FIG. 10E. Other schemes for determining face proximity ratios and assigning weighting values will be apparent to one of ordinary skill in the art upon reading this disclosure and are to be considered within the scope of the present disclosure.

FIG. 21 graphically illustrates an exemplary display device wherein more than one viewer has been detected. There may be zero, one or multiple viewers in front of the display device 50 at any given time. To account for this scenario, the viewers preferences 130 are used in accordance with their distance from the frame 870 872. The viewer response however is tied to the viewer's face, so this feedback is recorded individually 142 for each viewer 001.

In another embodiment of the present disclosure, the presentation content is targeted to a user who is not the viewer 001. This reference person may be a subject who is found in one or more of the images available to the display device 50, and is selected by the viewer 001 selecting the face of the subject as it is shown in an image appearing on the display device 50. Note also that multiple reference persons may be selected at the same time, in which case the composite profile 130 from multiple reference persons is used.

FIG. 22 graphically illustrates an exemplary graphical user interface for prompting a newly detected viewer to confirm identity, for the purpose of matching that viewer 011 to an existing profile 130. In an alternate embodiment of the disclosure, the viewer 001 may be prompted to confirm their identify 886 for the purpose of matching their face to an existing profile 130. If the presented face 001 matches the viewer 001, the viewer 001 would confirm the match 880, otherwise they would deny the match 882. Cancelling the match confirmation would cause the presentation selection process for the display device 50 to continue without viewer 001 confirmation 884.

Those skilled in the art will recognize improvements and modifications to the embodiments of the present disclosure. All such improvements and modifications are considered within the scope of the concepts disclosed herein and the claims that follow.

What is claimed is:

1. A method of operating a server device comprising:
    obtaining an image affinity score for a plurality of images between a reference person and a corresponding one of the plurality of images based on a subject affinity score, the subject affinity score being based on a social relationship between the reference person and an other subject appearing in the corresponding one of the plurality of images;
    designating, based on the image affinity score for the plurality of images, an image from the plurality of images defining a designated image; and
    sending, over a network, the designated image to an other device for display at the other device.

2. The method of claim 1 wherein the reference person and the other subject are members of a social network operated by the server device, the method further comprising:
    registering the reference person with the social network based on first information received over the network including first user inputs received at the other device from the reference person;
    authenticating the reference person with the social network based on second information received over the network including second user inputs received at the other device from the reference person; and
    obtaining image information identifying the plurality of images.

3. The method of claim 2 wherein the image information further comprises:
    for one or more images of the plurality of images, first one or more indicators to one or more subjects appearing in the one or more images; and
    for one or more subjects of a plurality of subjects appearing in the one or more images, second one or more indicators to one or more images in which the one or more subjects appear, and wherein one or more of the plurality of images contain a number of subjects chosen from a group consisting of no subjects, a single subject, and multiple subjects.

4. The method of claim 1 where to obtain the image affinity score and the subject affinity score, the method further comprising:
    computing the subject affinity score; and
    computing the image affinity score based on the subject affinity score.

5. The method of claim 1 wherein one or more of the plurality of images are stored at one or more sources chosen from a group consisting of:
    the server device,
    a social network server device coupled to the server device over a network, and
    a photosharing server device coupled to the server device over a network.

6. The method of claim 5 wherein the network is the Internet.

7. The method of claim 1 wherein the other device is one of a unitary display device, mobile phone, PDA, laptop computer, desktop computer.

8. The method of claim 1 wherein the other device is a display device and the reference person is a viewer of the display device and to obtain the subject affinity score the display device having been configured to obtain subject affinity information from the other device by:
    effecting presentation, on the display of the display device, information identifying the other subject appearing as a subject face in the plurality of images;
    effecting presentation, in an area adjacent to the information identifying the other subject, of a control operable to receive viewer input from the viewer reflecting the subject affinity score between the viewer and the other subject;
    receiving user input based on the control; and
    based on the user input, adjusting the subject affinity score for the other subject.

9. The method of claim 1 where in sending the designated image over the network to the other device the method further comprising:
    effecting a presentation of the designated image on the display of a display device wherein the display device is the other device.

10. The method of claim 1 wherein the other device is a display device and wherein the reference person is a viewer of the display device that has been matched to a subject appearing in the plurality of images.

11. The method of claim 10 wherein the subject affinity score is refined based on viewer response to the other subject appearing in an image of the plurality of images.

12. The method of claim 10 where to determine the image affinity score the method further comprising:
    resolving the other subject occurring in an image of the plurality of images and accumulating a numerical contribution from the other subject according to the subject affinity score between the viewer and the other subject in the image.

13. The method of claim 10 wherein the display device is equipped with a digital camera that is used to capture an image of a view defining a viewer image.

14. The method of claim 1 wherein the subject affinity score is determined based on identifying face co-occurrence instances between the reference person and the other subject appearing in a same image in the plurality of images.

15. The method of claim 1 wherein the reference person and the other subject are members of a social network operable to store a social relationship information, the social relationship information identifying a friend connection between the reference person and the other subject are built through an invitation process.

16. The method of claim 15 wherein the social relationship is determined based on a social distance, and the social distance defines a number of hops in a social graph of the social network between the reference person and the other subject.

17. The method of claim 15 wherein an other subject with a lower social distance to the reference person is awarded a higher subject affinity score.

18. The method of claim 15 wherein the subject affinity score is refined based on location history as tracked by an other device, associated with the other subject, reporting time-stamped GPS locations of the other device to the social network, with an other subject of closer average geographical proximity to the reference person having a closer social relationship and receiving a higher subject affinity score estimate.

19. The method of claim 15 wherein the social relationship is refined based on relationship qualifiers between the reference person and the other subject.

20. The method of claim 19 wherein the relationship qualifiers include one or more of: Lived Together, Worked Together, Went to School Together, Traveled Together, From An Organization, Team Or Group, In My Family, Through A Friend, We Dated.

21. The method of claim 15 wherein the social relationship is refined based on a duration of a friend relationship between the reference person and the other subject.

22. The method of claim 15 wherein the social relationship is refined based on a frequency of electronic communication through the social network occurring between the reference person and the other subject.

23. The method of claim 15 wherein the social relationship is refined based on a type of electronic communication through the social network occurring between the reference person and the other subject.

24. The method of claim 15 wherein the social relationship is non-symmetric between the reference person and the other subject.

25. The method of claim 15 wherein the social relationship is refined based on a count of mutual friends between the reference person and the other subject on the social network.

26. A server device comprising:
    a network interface operable to:
        couple over a network the server device to an other device of a plurality of other devices; and
    a processor and memory associated with the network interface operable to:
        obtain an image affinity score for a plurality of images between a reference person and a corresponding one of the plurality of images based on a subject affinity score,
        the subject affinity score being based on a social relationship between the reference person and an other subject appearing in the corresponding one of the plurality of images;
        designate, based on the image affinity score for the plurality of images, an image from the plurality of images defining a designated image; and
        send, over the network, the designated image to the other device for display at the other device.

27. The server device of claim 26 wherein the reference person and the other subject are members of a social network operated by the server device, the server device further operable to:
    register the reference person with the social network based on first information received over the network including first user inputs received at the other device from the reference person;
    authenticate the reference person with the social network based on second information received over the network including second user inputs received at the other device from the reference person; and
    obtain image information identifying the plurality of images.

28. The server device of claim 27 wherein the image information further comprises:
    for one or more images of the plurality of images, first one or more indicators to one or more subjects appearing in the one or more images; and
    for one or more subjects of a plurality of subjects appearing in the one or more images, second one or more indicators to one or more images in which the one or more subjects appear, and wherein one or more of the plurality of images contain a number of subjects chosen from a group consisting of no subjects, a single subject, and multiple subjects.

29. The server device of claim 26 where to obtain the image affinity score and the subject affinity score, the server device further operable to:
    compute the subject affinity score; and
    compute the image affinity score based on the subject affinity score.

30. The server device of claim 26 wherein one or more of the plurality of images are stored at one or more sources chosen from a group consisting of:
    the server device,
    a social network server device coupled to the server device over a network, and
    a photosharing server device coupled to the server device over a network.

31. The server device of claim 30 wherein the network is the Internet.

32. The server device of claim 26 wherein the other device is one of a unitary display device, mobile phone, PDA, laptop computer, desktop computer.

33. The server device of claim 26 wherein the other device is a display device and the reference person is a viewer of the display device and to obtain the subject affinity score the display device having been configured to obtain subject affinity information by:
    effecting presentation, on the display of the display device, information identifying the other subject appearing as a subject face in the plurality of images;
    effecting presentation, in an area adjacent to the information identifying the other subject, of a control operable to receive viewer input from the viewer reflecting the subject affinity score between the viewer and the other subject;
    receiving user input based on the control; and
    based on the user input, adjusting the subject affinity score for the other subject.

34. The server device of claim 26 where in sending the designated image over the network to the other device the server device further operable to:
    effect a presentation of the designated image on the display of a display device wherein the display device is the other device.

35. The server device of claim 26 wherein the other device is a display device and wherein the reference person is a viewer of the display device that has been matched to a subject appearing in the plurality of images.

36. The server device of claim 35 wherein the subject affinity score is refined based on viewer response to the other subject appearing in an image of the plurality of images.

37. The server device of claim 35 where to determine the image affinity score the server device further operable to:
    resolve the other subject occurring in an image of the plurality of images and accumulating a numerical contribution from the other subject according to the subject affinity score between the viewer and the other subject in the image.

38. The server device of claim 35 wherein the display device is equipped with a digital camera that is used to capture an image of a view defining a viewer image.

39. The server device of claim 26 wherein the subject affinity score is determined based on identifying face co-occurrence instances between the reference person and the other subject appearing in a same image in the plurality of images.

40. The server device of claim 39 wherein the reference person and the other subject are members of a social network operable to store a social relationship information, the social relationship information identifying a friend connection between the reference person and the other subject are built through an invitation process.

41. The server device of claim 40 wherein the social relationship is determined based on a social distance, and the social distance defines a number of hops in a social graph of the social network between the reference person and the other subject.

42. The server device of claim 40 wherein an other subject with a lower social distance to the reference person is awarded a higher subject affinity score.

43. The server device of claim 40 wherein the subject affinity score is refined based on location history as tracked by an other device, associated with the other subject, reporting time-stamped GPS locations of the other device to the social network, with an other subject of closer average geographical proximity to the reference person having a closer social relationship and receiving a higher subject affinity score estimate.

44. The server device of claim 40 wherein the social relationship is refined based on relationship qualifiers between the reference person and the other subject.

45. The server device of claim 44 wherein the relationship qualifiers include one or more of: Lived Together, Worked Together, Went to School Together, Traveled Together, From An Organization, Team Or Group, In My Family, Through A Friend, We Dated.

46. The server device of claim 40 wherein the social relationship is refined based on a duration of a friend relationship between the reference person and the other subject.

47. The server device of claim 40 wherein the social relationship is refined based on a frequency of electronic communication through the social network occurring between the reference person and the other subject.

48. The server device of claim 40 wherein the social relationship is refined based on a type of electronic communication through the social network occurring between the reference person and the other subject.

49. The server device of claim 40 wherein the social relationship is non-symmetric between the reference person and the other subject.

50. The server device of claim 40 wherein the social relationship is refined based on a count of mutual friends between the reference person and the other subject on the social network.

51. A system comprising:
a server device comprising:
  a network interface operable to:
    couple over a network the server device to an other device of a plurality of other devices; and
  a processor and memory associated with the network interface operable to:
    obtain an image affinity score for a plurality of images between a reference person and a corresponding one of the plurality of images based on a subject affinity score,
    the subject affinity score being based on a social relationship between the reference person and an other subject appearing in the corresponding one of the plurality of images;
    designate, based on the image affinity score for the plurality of images, an image from the plurality of images defining a designated image; and
    send, over the network, the designated image to the other device for display at the other device; and
a mobile client, when executed on the other device, operable to:
  receive the designated image from the server device; and
  display, on the display at the other device, the designated image.

52. The system of claim 51 further comprising:
the other device comprising
  an other network interface operable to:
    couple over the network the server device to the other device of the plurality of other devices; and
  an other processor and other memory associated with the network interface operable to:
    execute the mobile client.

53. A non-transitory computer readable medium storing program codes that when executed by a processor of a server device render the server device operable to:
  obtain an image affinity score for a plurality of images between a reference person and a corresponding one of the plurality of images based on a subject affinity score,
  the subject affinity score being based on a social relationship between the reference person and an other subject appearing in the corresponding one of the plurality of images;
  designate, based on the image affinity score for the plurality of images, an image from the plurality of images defining a designated image; and
  send, over a network, the designated image to an other device for display at the other device.

* * * * *